US012803888B2

(12) United States Patent
Yan et al.

(10) Patent No.: US 12,803,888 B2
(45) Date of Patent: Nov. 17, 2026

(54) INTENT PRE-EVALUATION METHOD AND APPARATUS

(71) Applicant: HUAWEI TECHNOLOGIES CO., LTD., Shenzhen (CN)

(72) Inventors: Wen Yan, Beijing (CN); Xianming Li, Shanghai (CN); Yexing Li, Shanghai (CN); Yijun Yu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 275 days.

(21) Appl. No.: 18/640,335

(22) Filed: Apr. 19, 2024

(65) Prior Publication Data

US 2024/0267304 A1 Aug. 8, 2024

Related U.S. Application Data

(63) Continuation of application No. PCT/CN2022/125322, filed on Oct. 14, 2022.

(30) Foreign Application Priority Data

Oct. 20, 2021 (CN) ......................... 202111223276.2

(51) Int. Cl.
*H04L 41/5009* (2022.01)
*H04B 17/309* (2015.01)
(Continued)

(52) U.S. Cl.
CPC ....... *H04L 41/5009* (2013.01); *H04B 17/328* (2023.05); *H04B 17/346* (2023.05); *H04W 28/0268* (2013.01)

(58) Field of Classification Search
CPC ..... G06F 40/30; H04B 17/328; H04B 17/346; H04L 43/08; H04L 43/55; H04L 41/0806;
(Continued)

(56) References Cited

U.S. PATENT DOCUMENTS 11,259,196 B2 * 2/2022 Mahimkar ............ H04W 24/04
11,894,990 B2 * 2/2024 Previti ................. G06N 3/0455
(Continued)

FOREIGN PATENT DOCUMENTS

CN 111277442 A 6/2020
CN 112583629 A 3/2021
(Continued)

OTHER PUBLICATIONS

International Search Report and Written Opinion issued in PCT/CN2022/125322, dated Nov. 30, 2022, 9 pages.
(Continued)

*Primary Examiner* — Eric Nowlin

(57) ABSTRACT

Embodiments of this application provide an intent pre-evaluation method and apparatus. The method includes: A first network element receives an intent target and a pre-evaluation type from a second network element; receives first information from a third network element, where the first information includes: operation impact information and/or first network key performance (KPI) impact information, the operation impact information indicates mutual exclusion information of the first operation, and the first KPI impact information indicates impact of the first operation on a KPI associated with the intent target or impact of the first operation on the network KPI; and determines, based on the first information, result information corresponding to the pre-evaluation type, and sends the result information to the second network element, where the result information includes pre-evaluation information of an intent achievement result or pre-evaluation information of impact on a KPI.

16 Claims, 13 Drawing Sheets

(51) Int. Cl.
*H04B 17/318* (2015.01)
*H04W 28/02* (2009.01)

(58) Field of Classification Search
CPC ............ H04L 41/145; H04L 41/5009; H04W 24/02; H04W 24/08; H04W 28/0268
See application file for complete search history.

(56) References Cited

U.S. PATENT DOCUMENTS

| | | | | |
|---|---|---|---|---|
| 2016/0014617 | A1* | 1/2016 | Sofuoglu | H04W 36/0085 370/252 |
| 2021/0258808 | A1* | 8/2021 | Mahimkar | H04W 24/08 |
| 2023/0327961 | A1* | 10/2023 | Previti | H04L 41/0866 709/224 |
| 2024/0214287 | A1* | 6/2024 | Abdelkader | H04L 41/0896 |
| 2025/0267071 | A1* | 8/2025 | Baktir | H04L 43/16 |

FOREIGN PATENT DOCUMENTS

| | | | | |
|---|---|---|---|---|
| EP | 4161020 A1 * | 4/2023 | | H04L 41/5041 |
| WO | WO-2022069036 A1 * | 4/2022 | | G06N 3/045 |
| WO | WO-2025230444 A1 * | 11/2025 | | H04L 41/5009 |
| WO | WO-2026033248 A1 * | 2/2026 | | H04W 24/02 |

OTHER PUBLICATIONS

3GPP TR 28.812 V17.1.0 3rd Generation Partnership Project; Technical Specification Group Services and System Aspects; Telecommunication management; Study on scenarios for Intent driven management services for mobile networks (Release 17), Dec. 2020, total 45 pages.

Extended European Search Report issued in EP22882757.2, dated Jan. 1, 2025, 10 pages.

* cited by examiner

INTENT PRE-EVALUATION METHOD AND APPARATUS

CROSS-REFERENCE TO RELATED APPLICATIONS

This application is a continuation of International Application No. PCT/CN2022/125322, filed on Oct. 14, 2022, which claims priority to Chinese Patent Application No. 202111223276.2, filed on Oct. 20, 2021. The disclosures of the aforementioned applications are hereby incorporated by reference in their entireties.

TECHNICAL FIELD

This application relates to the field of communication technologies, and in particular, to an intent pre-evaluation method and apparatus.

BACKGROUND

In an existing intent system, operations need to be continuously attempted for intent translation and decision. After a user delivers an intent target, an operation related to the intent target is selected through intent translation and intent decision, and the intent target is implemented based on the operation. In a process of implementing the intent target, if a gain does not meet the intent target, translation and decision are performed again. If the gain still cannot be met after all operations are performed, feedback indicating that the intent target cannot be achieved is given to the user. However, when the intent target cannot be achieved, implementation of the intent target modifies a current network status, resulting in low intent execution efficiency. Therefore, how to improve intent execution efficiency is a technical problem to be resolved by people skilled in the art.

SUMMARY

This application discloses an intent pre-evaluation method and apparatus, so that whether an intent can be completed can be learned or impact of intent implementation on a network can be learned of without modifying a network status. This helps improve the efficiency of intent execution.

A first aspect of embodiments of this application discloses an intent pre-evaluation method, including:

- a first network element receives an intent target and a pre-evaluation type from a second network element, where the pre-evaluation type includes pre-evaluation information of an intent achievement result or pre-evaluation information of impact on a network key performance indicator (KPI), and the intent target includes a first operation;
- the first network element receives first information from a third network element, where the first information includes one or more of the following: operation impact information or first KPI impact information, the operation impact information indicates mutual exclusion information of the first operation, and the first KPI impact information indicates impact of the first operation on a KPI associated with the intent target or impact of the first operation on the network KPI;
- the first network element determines, based on the first information, result information corresponding to the pre-evaluation type, where the result information includes pre-evaluation information of an intent achievement result or pre-evaluation information of impact on a KPI; and
- the first network element sends the result information to the second network element.

In the foregoing method, the second network element sends the intent target and the pre-evaluation type to the first network element. Correspondingly, the first network element determines, based on the first information, the result information corresponding to the pre-evaluation type, and sends the result information to the second network element. The result information includes the pre-evaluation information of the intent achievement result and the pre-evaluation information of the impact on the KPJ. In this way, whether an intent can be completed can be learned or impact of intent implementation on a network can be learned of without modifying a network status. This helps the second network element use this case as a reference, and improve intent execution efficiency.

In a possible implementation, the intent target includes an identifier of the intent target and/or a target value of the intent target.

In another possible implementation, the first network element further receives one or more of the following from the second network element: a pre-evaluation termination condition or a maximum pre-evaluation duration, where the pre-evaluation termination condition is used to determine whether to continue or terminate a process in which the first network element determines, based on the first information, the result information corresponding to the pre-evaluation type; and the maximum pre-evaluation duration is used to determine whether to continue or terminate a process in which the first network element determines, based on the first information, the result information corresponding to the pre-evaluation type.

In the foregoing method, the pre-evaluation termination condition or the maximum pre-evaluation duration can be used to enable a pre-evaluation process to be performed within a proper range, to improve system performance.

In another possible implementation, if the result information includes the pre-evaluation information of the intent achievement result, the result information further includes one or more of the following: confidence of the result information, a duration required for achieving the intent target, or a reason why the intent target is not achieved.

In the foregoing method, the result information includes one or more of the foregoing items for the second network element to perform analysis. This helps improve intent execution efficiency.

In another possible implementation, if the result information includes the pre-evaluation information of the impact on the KPI, the result information further includes one or more of the following: the confidence of the result information, a KPI list corresponding to the pre-evaluation information of the impact on the KPI, and confidence of the pre-evaluation information of the impact on the KPI.

In another possible implementation, the first information further includes one or more of the following: network performance data information, information about effective time of the first operation, and information about another intent target other than the intent target.

In another possible implementation, the network KPI includes one or more of the following: a latency, a throughput rate, a rate, physical resource block (PRB) utilization, a jitter, a radio resource control (RRC) setup success rate, a quality of service flow (QoS flow) setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

A second aspect of embodiments of this application discloses an intent pre-evaluation method, including:

a second network element sends an intent target and a pre-evaluation type to a first network element, where the pre-evaluation type includes pre-evaluation information of an intent achievement result or pre-evaluation information of impact on a network key performance indicator (KPI), and the intent target includes a first operation; and the second network element receives result information from the first network element, where the result information is result information that corresponds to the pre-evaluation type and that is determined by the first network element based on the first information, the result information includes pre-evaluation information of an intent achievement result or pre-evaluation information of impact on a KPI, the first information includes one or more of the following: operation impact information or first KPI impact information, the operation impact information indicates mutual exclusion information of the first operation, and the first KPI impact information indicates impact of the first operation on a KPI associated with the intent target or impact of the first operation on the network KPI.

In the foregoing method, the second network element sends the intent target and the pre-evaluation type to the first network element. Correspondingly, the first network element determines, based on the first information, the result information corresponding to the pre-evaluation type, and sends the result information to the second network element. The result information includes the pre-evaluation information of the intent achievement result and the pre-evaluation information of the impact on the KPJ. In this way, whether an intent can be completed can be learned or impact of intent implementation on a network can be learned of without modifying a network status. This helps the second network element use this case as a reference, and improve intent execution efficiency.

In a possible implementation, the intent target includes an identifier of the intent target and/or a target value of the intent target.

In another possible implementation, the second network element further sends one or more of the following to the first network element: a pre-evaluation termination condition or a maximum pre-evaluation duration, where the pre-evaluation termination condition is used to determine whether to continue or terminate a process in which the first network element determines, based on the first information, the result information corresponding to the pre-evaluation type; and the maximum pre-evaluation duration is used to determine whether to continue or terminate a process in which the first network element determines, based on the first information, the result information corresponding to the pre-evaluation type.

In another possible implementation, if the result information includes the pre-evaluation information of the intent achievement result, the result information further includes one or more of the following: confidence of the result information, a duration required for achieving the intent target, or a reason why the intent target is not achieved.

In another possible implementation, if the result information includes the pre-evaluation information of the impact on the KPI, the result information further includes one or more of the following: the confidence of the result information, a KPI list corresponding to the pre-evaluation information of the impact on the KPI, and confidence of the pre-evaluation information of the impact on the KPI.

In another possible implementation, the first information further includes one or more of the following: network performance data information, information about effective time of the first operation, and information about another intent target other than the intent target.

In another possible implementation, the network KPI includes one or more of the following: a latency, a throughput rate, a rate, physical resource block (PRB) utilization, a jitter, a radio resource control (RRC) setup success rate, a quality of service flow (QoS) flow setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

A third aspect of embodiments of this application discloses an intent pre-evaluation method, including:

a first network element receives pre-evaluation information of impact on a network key performance indicator (KPI) from a second network element;

the first network element receives first information from a third network element, where the first information includes one or more of the following: operation impact information or second KPI impact information, the operation impact information indicates mutual exclusion information of a second operation, the second KPI impact information indicates impact of the second operation on the network KPI, and the second operation is an operation that affects the network KPI;

the first network element determines, based on the first information, an evaluation value corresponding to the pre-evaluation information; and the first network element sends the evaluation value to the second network element.

In the foregoing method, the second network element sends the pre-evaluation information of the impact on the network KPI to the first network element. Correspondingly, the first network element determines the evaluation value of the pre-evaluation information based on the first information, and sends the evaluation value to the second network element. In this way, the evaluation value can be fed back without modifying a network status. This helps the second network element use this case as a reference, and helps improve intent execution efficiency.

In a possible implementation, the first network element further receives one or more of the following from the second network element: a pre-evaluation constraint condition, a pre-evaluation termination condition, or a maximum pre-evaluation duration, where the pre-evaluation constraint condition indicates a constraint in performing a process of determining, based on the first information, the evaluation value corresponding to the pre-evaluation information; the pre-evaluation termination condition is used to determine whether to continue or terminate a process of determining, based on the first information, the evaluation value corresponding to the pre-evaluation information; and the maximum pre-evaluation duration is used to determine whether to continue or terminate a process of determining, based on the first information, the evaluation value corresponding to the pre-evaluation information.

In the foregoing method, the pre-evaluation constraint condition, the pre-evaluation termination condition, or the maximum pre-evaluation duration can be used to enable a pre-evaluation process to be performed within a proper range, to improve system performance.

In another possible implementation, that the first network element determines, based on the first information, an evaluation value corresponding to the pre-evaluation information includes: The first network element determines, based on the first information, the evaluation value corresponding to the pre-evaluation information and confidence of the evaluation value.

In the foregoing method, the confidence of the evaluation value is determined, and the confidence of the evaluation value is sent to the second network element for reference by the second network element. This helps improve intent execution efficiency.

In another possible implementation, the first information further includes one or more of the following: network performance data information, effective time of the second operation, and information about an intent corresponding to another network KPI other than the network KPI.

In another possible implementation, the network KPI includes one or more of the following: a latency, a throughput rate, a rate, physical resource block (PRB) utilization, a jitter, a radio resource control (RRC) setup success rate, a quality of service flow (QoS flow) setup success rate, a call setup success rate, a radio call drop rate, an intra-frequency handover success rate, an inter-frequency handover success rate, central processing unit CPU utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

A fourth aspect of embodiments of this application discloses an intent pre-evaluation method, including:

a second network element sends pre-evaluation information of impact on a network key performance indicator (KPI) to a first network element; and the second network element receives an evaluation value corresponding to the pre-evaluation information from the first network element, where the evaluation value corresponding to the pre-evaluation information is determined based on the first information, the first information includes one or more of the following: operation impact information or second KPI impact information, the operation impact information indicates mutual exclusion information of a second operation, the second KPI impact information indicates impact of the second operation on the network KPI, and the second operation is an operation that affects the network KPI.

In the foregoing method, the second network element sends the pre-evaluation information of the impact on the network KPI to the first network element. Correspondingly, the first network element determines the evaluation value of the pre-evaluation information based on the first information, and sends the evaluation value to the second network element. In this way, the evaluation value can be fed back without modifying a network status. This helps the second network element use this case as a reference, and helps improve intent execution efficiency.

In a possible implementation, the second network element sends one or more of the following to the first network element: a pre-evaluation constraint condition, a pre-evaluation termination condition, or a maximum pre-evaluation duration, where the pre-evaluation constraint condition indicates a constraint in performing a process of determining, based on the first information, the evaluation value corresponding to the pre-evaluation information; the pre-evaluation termination condition is used to determine whether to continue or terminate a process of determining, based on the first information, the evaluation value corresponding to the pre-evaluation information; and the maximum pre-evaluation duration is used to determine whether to continue or terminate a process of determining, based on the first information, the evaluation value corresponding to the pre-evaluation information.

In another possible implementation, the method further includes: The second network element receives confidence of the evaluation value from the first network element, where the confidence of the evaluation value is determined based on the first information.

In another possible implementation, the first information further includes one or more of the following: network performance data information, effective time of the second operation, and information about an intent corresponding to another network KPI other than the network KPI.

In another possible implementation, the network KPI includes one or more of the following: a latency, a throughput rate, a rate, physical resource block PRB utilization, a jitter, a radio resource control (RRC) setup success rate, a quality of service flow (QoS) flow setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

A fifth aspect of embodiments of this application discloses an intent pre-evaluation apparatus, including a communication unit and a processing unit.

The communication unit is configured to receive an intent target and a pre-evaluation type from a second network element, where the pre-evaluation type includes pre-evaluation information of an intent achievement result or pre-evaluation information of impact on a network key performance indicator (KPI), and the intent target includes a first operation.

The communication unit is configured to receive first information from a third network element, where the first information includes one or more of the following: operation impact information or first KPI impact information, the operation impact information indicates mutual exclusion information of the first operation, and the first KPI impact information indicates impact of the first operation on a KPI associated with the intent target or impact of the first operation on the network KPI.

The processing unit is configured to determine, based on the first information, result information corresponding to the pre-evaluation type, where the result information includes pre-evaluation information of an intent achievement result or pre-evaluation information of impact on a KPI.

The communication unit is configured to send the result information to the second network element.

In a possible implementation, the intent target includes an identifier of the intent target and/or a target value of the intent target.

In another possible implementation, the communication unit is further configured to receive one or more of the following from the second network element: a pre-evaluation termination condition or a maximum pre-evaluation duration, where the pre-evaluation termination condition is used to determine whether to continue or terminate a process in which the apparatus determines, based on the first information, the result information corresponding to the pre-evaluation type; and the maximum pre-evaluation duration is used to determine whether to continue or terminate a process in which the apparatus determines, based on the first information, the result information corresponding to the pre-evaluation type.

In another possible implementation, if the result information includes the pre-evaluation information of the intent achievement result, the result information further includes one or more of the following: confidence of the result information, a duration required for achieving the intent target, or a reason why the intent target is not achieved.

In another possible implementation, if the result information includes the pre-evaluation information of the impact on the KPI, the result information further includes one or more of the following: the confidence of the result information, a KPI list corresponding to the pre-evaluation information of the impact on the KPI, and confidence of the pre-evaluation information of the impact on the KPI.

In another possible implementation, the first information further includes one or more of the following: network performance data information, information about effective time of the first operation, and information about another intent target other than the intent target.

In another possible implementation, the network KPI includes one or more of the following: a latency, a throughput rate, a rate, physical resource block (PRB) utilization, a jitter, a radio resource control (RRC) setup success rate, a quality of service flow (QoS) flow setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

For technical effects brought by the fifth aspect or the possible implementations, refer to the descriptions of the technical effects brought by the first aspect or the corresponding implementations.

A sixth aspect of embodiments of this application discloses an intent pre-evaluation apparatus, including:

- a communication unit, configured to receive pre-evaluation information of impact on a network key performance indicator (KPI) from a second network element;
- the communication unit, configured to receive first information from a third network element, where the first information includes one or more of the following: operation impact information or second KPI impact information, the operation impact information indicates mutual exclusion information of a second operation, the second KPI impact information indicates impact of the second operation on the network KPI, and the second operation is an operation that affects the network KPI;
- a processing unit, configured to determine, based on the first information, an evaluation value corresponding to the pre-evaluation information; and
- the communication unit, configured to send the evaluation value to the second network element.

In a possible implementation, the communication unit is further configured to receive one or more of the following from the second network element: a pre-evaluation constraint condition, a pre-evaluation termination condition, or a maximum pre-evaluation duration, where the pre-evaluation constraint condition indicates a constraint in performing a process of determining, based on the first information, the evaluation value corresponding to the pre-evaluation information; the pre-evaluation termination condition is used to determine whether to continue or terminate a process of determining, based on the first information, the evaluation value corresponding to the pre-evaluation information; and the maximum pre-evaluation duration is used to determine whether to continue or terminate a process of determining, based on the first information, the evaluation value corresponding to the pre-evaluation information.

In another possible implementation, the communication unit is configured to determine, based on the first information, the evaluation value corresponding to the pre-evaluation information and confidence of the evaluation value.

In another possible implementation, the first information further includes one or more of the following: network performance data information, effective time of the second operation, and information about an intent corresponding to another network KPI other than the network KPI.

In another possible implementation, the network KPI includes one or more of the following: a latency, a throughput rate, a rate, physical resource block (PRB) utilization, a jitter, a radio resource control (RRC) setup success rate, a quality of service flow (QoS) flow setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

For technical effects brought by the sixth aspect or the possible implementations, refer to the descriptions of the technical effects brought by the third aspect or the corresponding implementations.

A seventh aspect of embodiments of this application discloses an intent pre-evaluation apparatus. The apparatus includes at least one processor and a communication interface, and the at least one processor is configured to invoke a computer program stored in at least one memory, to perform the following operations:

receiving an intent target and a pre-evaluation type from a second network element through the communication interface, where the pre-evaluation type includes pre-evaluation information of an intent achievement result or pre-evaluation information of impact on a network key performance indicator (KPI), and the intent target includes a first operation;

receiving first information from a third network element through the communication interface, where the first information includes one or more of the following: operation impact information or first KPI impact information, the operation impact information indicates mutual exclusion information of the first operation, and the first KPI impact information indicates impact of the first operation on a KPI associated with the intent target or impact of the first operation on the network KPI;

determining, based on the first information, result information corresponding to the pre-evaluation type, where the result information includes pre-evaluation information of an intent achievement result or pre-evaluation information of impact on a KPI; and sending the result information to the second network element through the communication interface.

In a possible implementation, the intent target includes an identifier of the intent target and/or a target value of the intent target.

In another possible implementation, the at least one processor is further configured to receive one or more of the following from the second network element through the communication interface: a pre-evaluation termination condition or a maximum pre-evaluation duration, where the pre-evaluation termination condition is used to determine whether to continue or terminate a process in which the apparatus determines, based on the first information, the result information corresponding to the pre-evaluation type; and the maximum pre-evaluation duration is used to determine whether to continue or terminate a process in which the apparatus determines, based on the first information, the result information corresponding to the pre-evaluation type.

In another possible implementation, if the result information includes the pre-evaluation information of the intent achievement result, the result information further includes one or more of the following: confidence of the result information, a duration required for achieving the intent target, or a reason why the intent target is not achieved.

In another possible implementation, if the result information includes the pre-evaluation information of the impact on the KPI, the result information further includes one or more of the following: the confidence of the result information, a KPI list corresponding to the pre-evaluation information of the impact on the KPI, and confidence of the pre-evaluation information of the impact on the KPI.

In another possible implementation, the first information further includes one or more of the following: network performance data information, information about effective time of the first operation, and information about another intent target other than the intent target.

In another possible implementation, the network KPI includes one or more of the following: a latency, a throughput rate, a rate, physical resource block (PRB) utilization, a jitter, a radio resource control (RRC) setup success rate, a quality of service flow (QoS) flow setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

For technical effects brought by the seventh aspect or the possible implementations, refer to the descriptions of the technical effects brought by the first aspect or the corresponding implementations.

An eighth aspect of embodiments of this application discloses an intent pre-evaluation apparatus. The apparatus includes at least one processor and a communication interface, and the at least one processor is configured to invoke a computer program stored in at least one memory, to perform the following operations:

receiving pre-evaluation information of impact on a network key performance indicator (KPI) from a second network element through the communication interface;

receiving first information from a third network element through the communication interface, where the first information includes one or more of the following: operation impact information or second KPI impact information, the operation impact information indicates mutual exclusion information of a second operation, the second KPI impact information indicates impact of the second operation on the network KPI, and the second operation is an operation that affects the network KPI;

determining, based on the first information, an evaluation value corresponding to the pre-evaluation information; and sending the evaluation value to the second network element through the communication interface.

In a possible implementation, the at least one processor is further configured to receive one or more of the following from the second network element through the communication interface: a pre-evaluation constraint condition, a pre-evaluation termination condition, or a maximum pre-evaluation duration, where the pre-evaluation constraint condition indicates a constraint in performing a process of determining, based on the first information, the evaluation value corresponding to the pre-evaluation information; the pre-evaluation termination condition is used to determine whether to continue or terminate a process of determining, based on the first information, the evaluation value corresponding to the pre-evaluation information; and the maximum pre-evaluation duration is used to determine whether to continue or terminate a process of determining, based on the first information, the evaluation value corresponding to the pre-evaluation information.

In another possible implementation, the at least one processor is further configured to determine confidence of the evaluation value based on the first information.

In another possible implementation, the first information further includes one or more of the following: network performance data information, effective time of the second operation, and information about an intent corresponding to another network KPI other than the network KPI.

In another possible implementation, the network KPI includes one or more of the following: a latency, a throughput rate, a rate, physical resource block (PRB) utilization, a jitter, a radio resource control (RRC) setup success rate, a quality of service flow (QoS) flow setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

For technical effects brought by the eighth aspect or the possible implementations, refer to the descriptions of the technical effects brought by the third aspect or the corresponding implementations.

A ninth aspect of embodiments of this application discloses a chip system. The chip system includes at least one processor and a communication interface, and the at least one processor is configured to invoke a computer program stored in at least one memory, to implement the method according to any one of the foregoing aspects or the possible implementations of the foregoing aspects.

A tenth aspect of embodiments of this application discloses a computer-readable storage medium. The computer-readable storage medium stores program instructions, and when the program instructions are run on a processor, the method according to any one of the foregoing aspects or the possible implementations of the foregoing aspects is implemented.

An eleventh aspect of embodiments of this application discloses a computer program product. When the computer program product runs on a processor, the method according to any one of the foregoing aspects or the possible implementations of the foregoing aspects is implemented.

BRIEF DESCRIPTION OF DRAWINGS

The following describes accompanying drawings used in embodiments of this application.

DESCRIPTION OF EMBODIMENTS

The following describes embodiments of this application with reference to the accompanying drawings in embodiments of this application.

Technical terms in embodiments of this application are first explained.

Intent: means an expectation for an action system. The intent may include one or more of the following: a requirement, an intent target, and a constraint.

Intent instance: means an object obtained by instantiating an intent. For example, in this application, an intent may be replaced with an intent instance.

Intent target: indicates a target value that needs to be achieved by an intent.

Intent translation: is a procedure of translating an intent into an intent executable command, a rule, or a sub-intent.

Intent execution: means delivering an intent executable command, a sub-intent, or a rule, and adjusting the intent executable command, the sub-intent, or the rule based on a network environment and an intent achievement status.

Intent executable command: means a series of instructions formed by performing operations such as translation and decision on an intent.

Intent schema: specifies syntax and semantics of an intent expression. The intent schema may include one or more of the following: a field, a value range of the field, a type of the field, and a hierarchical relationship between fields. For example, a field may be used to describe a type, a name, or a consumer of an intent schema.

Intent creation: means creating an intent in an intent system and creating a corresponding intent context.

Intent knowledge: The intent knowledge is a related parameter of an intent schema stored in an intent knowledge base. For example, the related parameter may include one or more of the following: an executable operation corresponding to an intent, an intent action entity identifier, or an intent action entity type.

Intent operation: is an executable operation corresponding to an intent target.

Intent conflict: When two intents cannot be achieved at the same time due to mutual exclusion of intent expressions, executable operations, or semantics, it means that the two intents conflict. Optionally, the intent conflict may be a conflict between an intent that needs to be created and an intent in an active state in a system.

Figure 1:
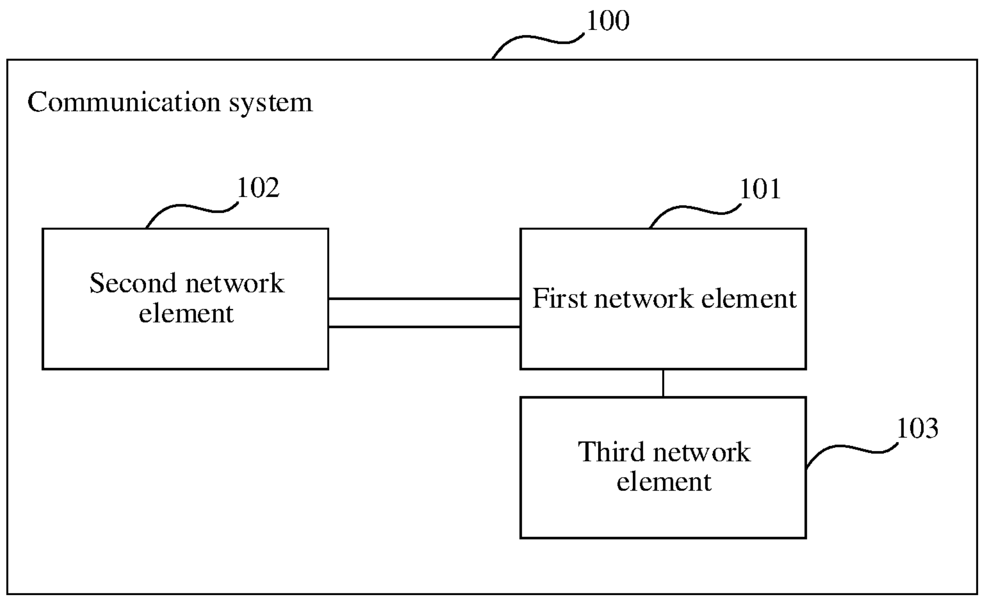
FIG. 1 is a diagram of a structure of an example communication system according to an embodiment of this application.

FIG. 1 is a diagram of a structure of an example communication system 100 according to an embodiment of this application. The communication system 100 includes a first network element 101, a second network element 102, and a third network element 103. The second network element 102 may be a network element in a business support system (BSS), an operation support system (OSS), an application (APP), or a third-party user. The first network element 101 and the third network element 103 each may be a network element in one or more of the following systems: a wireless intent driven network (wIDN) system, an experiential networked intelligence (ENI) system proposed by the European Telecommunications Standards Institute (ETSI), and an intent driven network management service (IDMS) system proposed by the 3rd Generation Partnership Project (3GPP).

Figure 2:
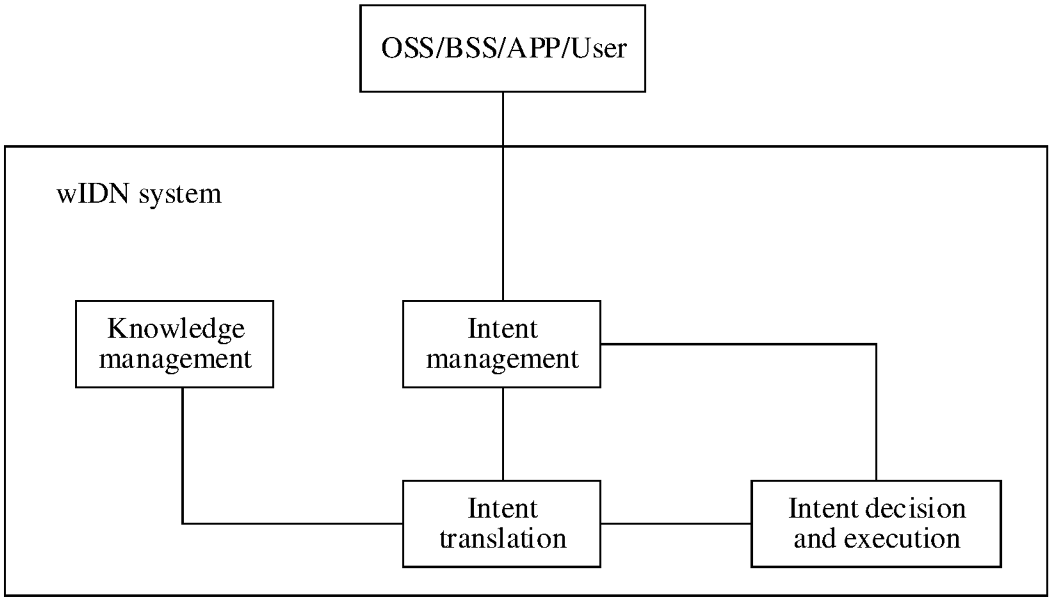
FIG. 2 is a diagram of an architecture of an existing wIDN system according to an embodiment of this application.

1. wIDN system: can translate an intent instruction into an operation command set corresponding to a wireless network, and further supports functions such as decomposition into sub-intents and intent execution and maintenance. As shown in FIG. 2, an existing wIDN system architecture includes an intent management (IM) module, an intent translation (IT) module, a knowledge management (KM) module, and an intent decision and execution (IDE) module. Functions of the modules are as follows:

(1) Intent management module: manages an intent schema and manages an intent instance.

(2) Intent translation module: performs intent translation, to translate an intent into a criterion that can be understood by a network and that is used to determine whether the intent is achieved, and an operation that can be understood by the network and that needs to be performed to achieve the intent.

(3) Knowledge management module: manages intent knowledge, and provides an intent knowledge query function.

(4) Intent decision and execution module: executes an intent.

An intent management module entity may include two sub-functions: an intent instance base and an intent schema base. The intent instance base is used to store an intent instance, and the intent schema base is used to store an intent schema. A knowledge management module entity may include an intent knowledge base, and the intent knowledge base is used to store intent knowledge.

Figure 3:
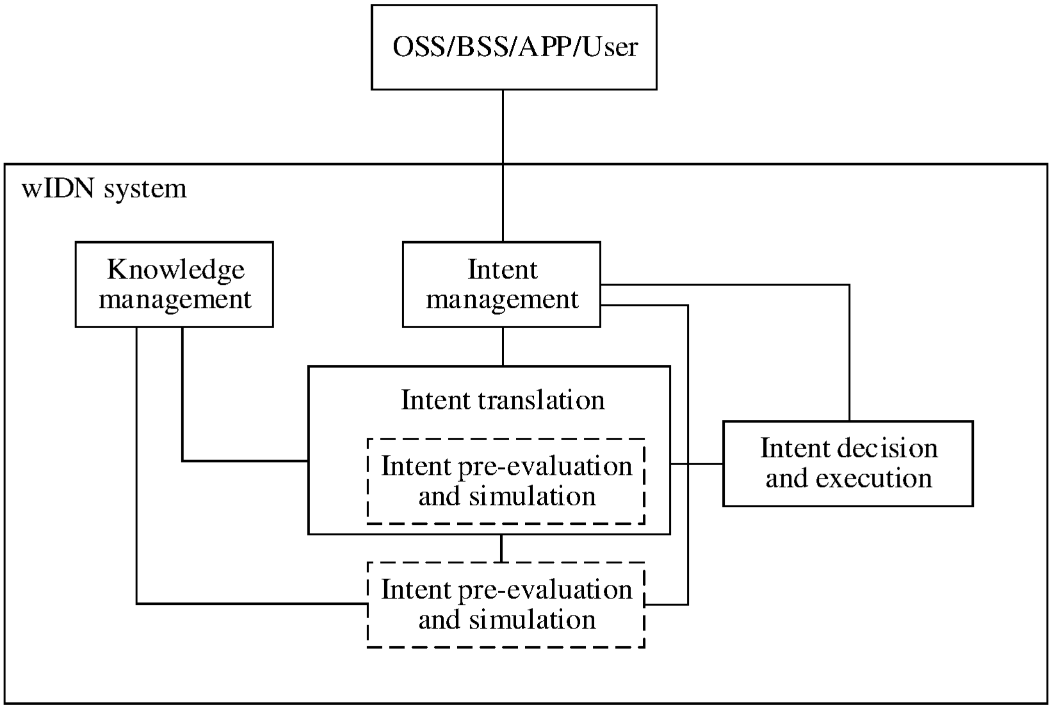
FIG. 3 is a diagram of an architecture of an example improved wIDN system according to an embodiment of this application.

The wIDN system provided in this embodiment of this application further includes an intent pre-evaluation and simulation (Intent Evaluation and Simulation, IES) module, as shown in FIG. 3. The intent pre-evaluation and simulation module is configured to pre-evaluate an intent. For example, the intent pre-evaluation and simulation module may be implemented as an independent network element or a function module, or may be included in the intent translation module for implementation. In other words, the intent translation module is enhanced, and an enhanced intent translation module may implement a function implemented by the intent pre-evaluation and simulation module. When the intent pre-evaluation and simulation module is implemented as an independent network element or a function module, the first network element 101 in the communication system shown in FIG. 1 may be an intent pre-evaluation and simulation module entity, and the third network element 103 in the communication system shown in FIG. 1 may be a knowledge management module entity. When the intent pre-evaluation and simulation module is implemented by using the intent translation module, the first network element 101 in the communication system shown in FIG. 1 may be an intent translation module entity. Division into the foregoing modules is not fixed, and is merely used as an example. This is not limited in embodiments of this application.

Figure 4:
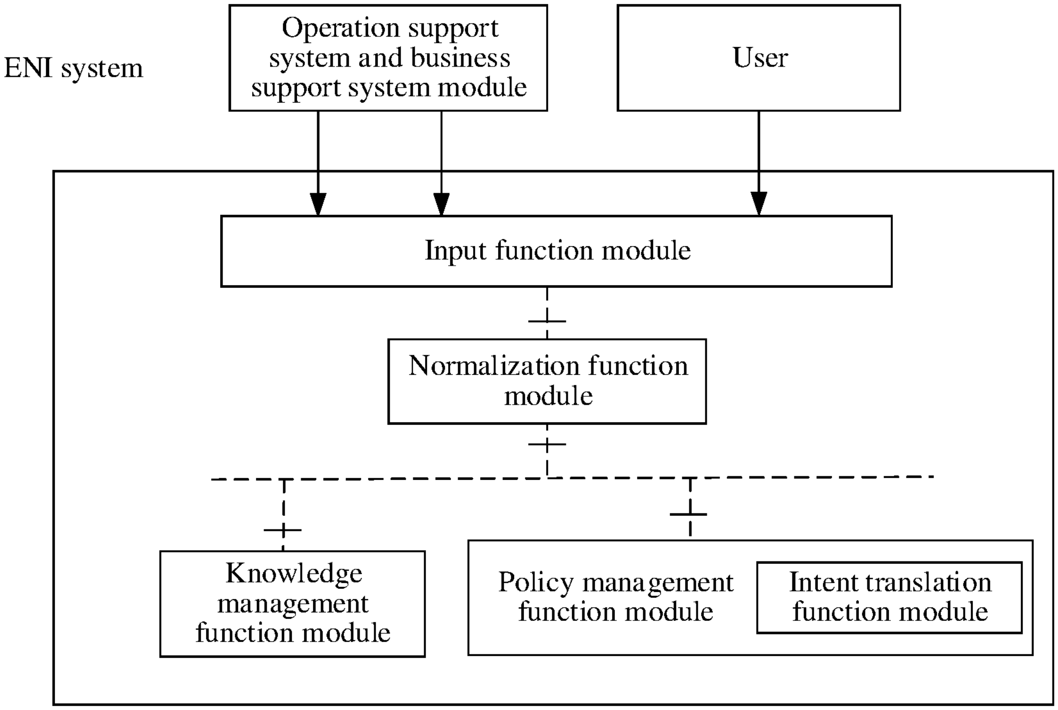
FIG. 4 is a diagram of an architecture of an existing ENI system according to an embodiment of this application.

2. ENI system: As shown in FIG. 4, an architecture of the ENI system includes one or more of the following function modules: an input function module (Data Ingestion Function Block), a normalization function module (Normalization Function Block), a knowledge management function module (Knowledge Management Function Block), an intent translation function module (Intent Translation Function Block), an operation support system and business support system module (OSS- and BSS-like Functionality), and a third-party user (User). Functions of the modules are implemented as follows:

(1) Input function module: is responsible for receiving data from an external system.

(2) Normalization function module: is responsible for performing an operation such as normalization on data.

(3) Knowledge management function module: is responsible for analyzing an existing network status and storing intent knowledge and intent context knowledge.

(4) Intent translation function module: is configured to translate a received intent policy into a command that can be identified by an ENI internal system, and may be placed in a policy management function module (Policy Management Function Block).

(5) Operation support system and business support system module: is responsible for inputting an intent to the ENI system.

(6) Third-party user (User): is responsible for inputting an intent to the ENI system.

The ENI system provided in this embodiment of this application further includes an intent pre-evaluation and simulation (Intent Evaluation and Simulation) module. The intent pre-evaluation and simulation module is configured to pre-evaluate an intent. For example, the intent pre-evaluation and simulation module may be implemented as an independent network element or a function module, or may be included in the intent translation module for implementation. In other words, the intent translation module is enhanced, and an enhanced intent translation module may implement a function implemented by the intent pre-evaluation and simulation module. When the intent pre-evaluation and simulation module is implemented as an independent network element or a function module, the first network element 101 in the communication system shown in FIG. 1 may be an intent pre-evaluation and simulation module entity, and the third network element 103 in the communication system shown in FIG. 1 may be a knowledge management function module entity. When the intent pre-evaluation and simulation module is implemented by using the intent translation function module, the first network element 101 in the communication system shown in FIG. 1 may be an intent translation function module entity. Division into the foregoing modules is not fixed, and is merely used as an example. This is not limited in embodiments of this application.

Figure 5:
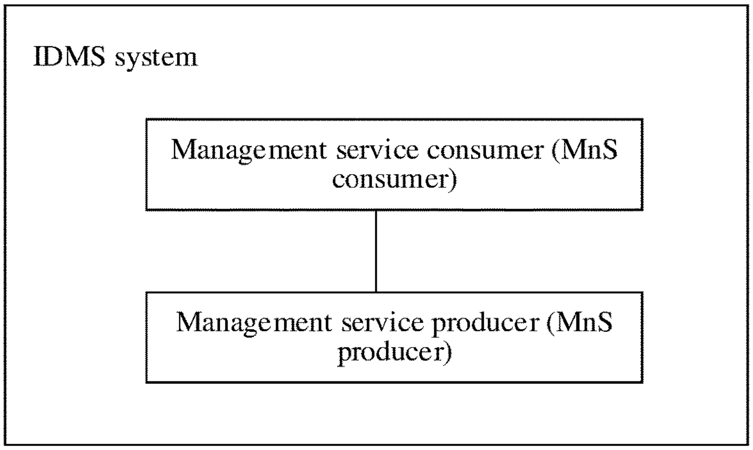
FIG. 5 is a diagram of an architecture of an existing IDMS system according to an embodiment of this application.

3. IDMS system proposed by 3GPP: As shown in FIG. 5, an architecture of the IDMS system includes a management service (MnS) consumer and an MnS producer. The MnS consumer may be an intent consumer in this embodiment of this application, and the MnS producer may be an intent service producer in this embodiment of this application. The MnS consumer is configured to send an intent service request, for example, intent creation or intent modification. The MnS producer is configured to: manage an intent schema and manage an intent instance; perform intent translation, to translate an intent into a criterion that can be understood by a network and that is used to determine whether the intent is achieved, and an operation that can be understood by the network and that needs to be performed to achieve the intent; manage intent knowledge and provide an intent knowledge query function; and execute an intent. In embodiments of this application, a function of the intent service producer in the IDMS system may be improved, and an intent pre-evaluation function is added, to implement the method in embodiments of this application.

Figure 6:
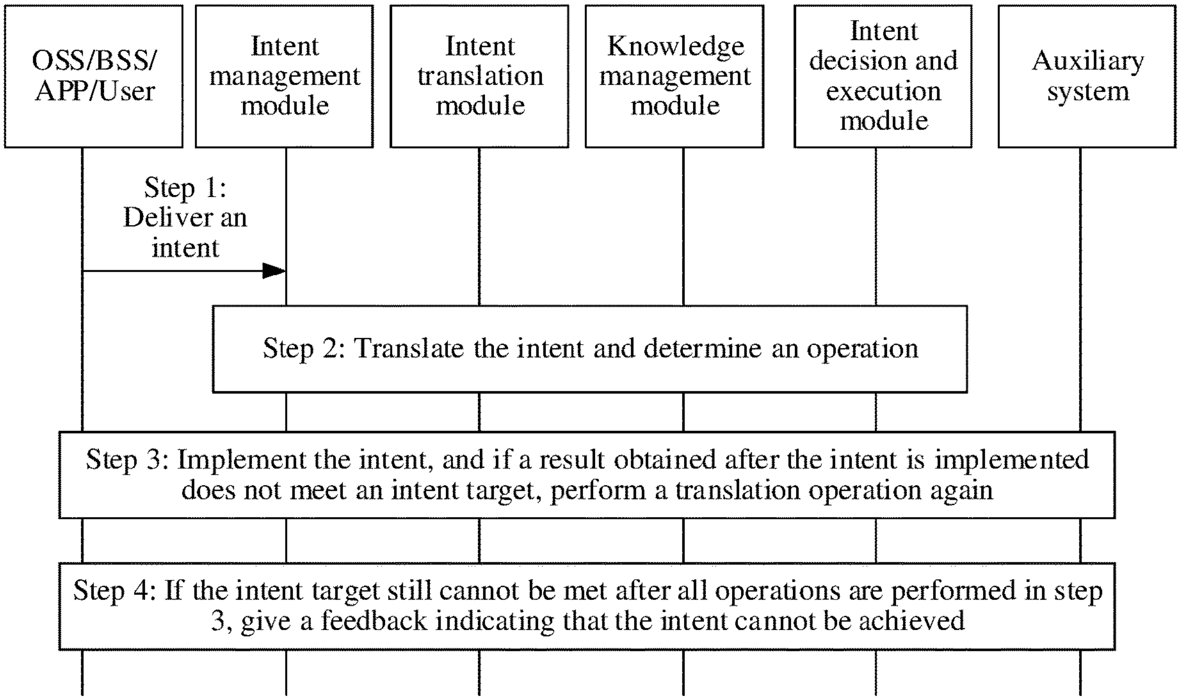
FIG. 6 is a flowchart of example intent implementation according to an embodiment of this application.

An existing intent system is shown in FIG. 2, and operations need to be continuously attempted for intent translation and decision. After a user delivers an intent, an operation is selected through intent translation and intent decision. After the intent is implemented, if a result obtained through intent implementation does not meet an intent target, translation and decision are performed again. If the intent target still cannot be met after all operations are performed, feedback indicating that the intent cannot be achieved is given to the user. Specific steps are shown in FIG. 6. An auxiliary system shown in FIG. 6 may also be referred to as an intent action system, that is, a network element on which an operation generated by an intent acts.

(1) Step 1: A user delivers an intent.

(2) Step 2: An intent translation module in the intent system translates the intent and determines an intent operation.

(3) Step 3: Implement the intent based on the intent operation. After the intent is implemented in the system, the intent system checks a result obtained through intent implementation. If the result obtained through intent implementation does not meet an intent target, intent translation in step 2 is performed again to obtain an intent operation, the intent is implemented again, and a result obtained through intent implementation is checked.

(4) Step 4: If the intent target still cannot be met after all operations are performed in step 3, give feedback indicating that the intent cannot be achieved to the user.

In step 2 and step 3, a plurality of intent operations need to be repeatedly attempted, and a network status, for example, a network resource status or a network performance status, is modified in each attempt. Therefore, intent execution efficiency is low. Therefore, how to improve intent execution efficiency is a technical problem being resolved by a person skilled in the art. To resolve the foregoing problem, embodiments of this application provide the following solutions.

Figure 7:
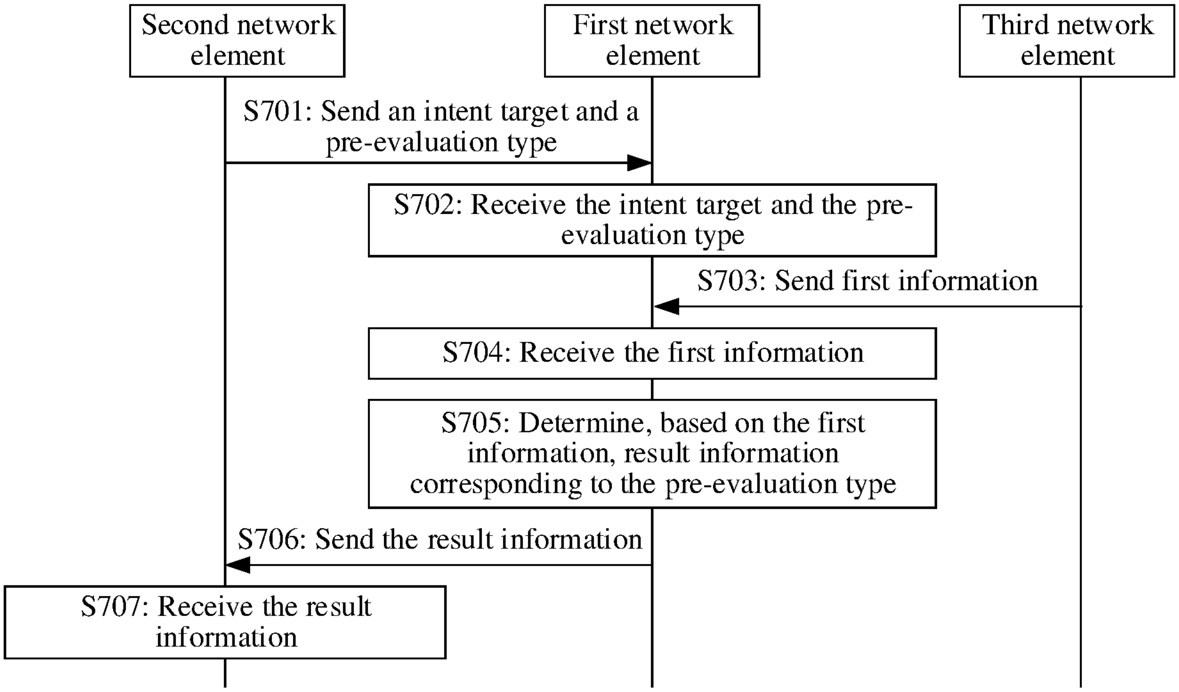
FIG. 7 is a schematic flowchart of an example intent pre-evaluation method according to an embodiment of this application.

FIG. 7 shows an example intent pre-evaluation method according to an embodiment of this application. The method may be implemented in an intent creation process or after intent creation. The method includes but is not limited to the following steps.

Step S701: A second network element sends an intent target and a pre-evaluation type to a first network element.

Step S702: The first network element receives the intent target and the pre-evaluation type from the second network element.

For example, the intent target includes an identifier (targetName) of the intent target and/or a target value (targetValue) of the intent target. For example, the intent target is to increase a throughput rate by 10%, the identifier of the intent target may be the throughput rate, and the target value of the intent target may be 10%.

For example, the pre-evaluation type includes pre-evaluation information of an intent achievement result or pre-evaluation information of impact on a network key performance indicator (KPI). The impact on the network KPI may be pre-evaluated impact on the network KPI after implementation of the intent target. The pre-evaluation information of the impact on the network KPI may be a network KPI list.

For example, the network KPI includes one or more of the following: a latency, a throughput rate, a rate, physical resource block (PRB) utilization, a jitter, a radio resource control (RRC) setup success rate, a quality of service (QoS) flow (Flow) setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

Optionally, the first network element further receives indication information from the second network element, where the indication information indicates to pre-evaluate the intent target. When the indication information indicates not to pre-evaluate the intent target, subsequent steps are not performed.

For example, the first network element further receives one or more of the following from the second network element: a pre-evaluation termination condition or a maximum pre-evaluation duration. The pre-evaluation termination condition is used to determine whether to continue or terminate a process in which the first network element determines, based on first information, result information corresponding to the pre-evaluation type; and the maximum pre-evaluation duration is used to determine whether to continue or terminate a process in which the first network element determines, based on first information, result information corresponding to the pre-evaluation type. For example, the first network element further receives the pre-evaluation termination condition from the second network element, where the pre-evaluation termination condition is that pre-evaluation is stopped if a pre-evaluation process occupies more than 70% of system resources. For example, the first network element further receives the maximum pre-evaluation duration from the second network element, where the maximum pre-evaluation duration means that pre-evaluation is stopped if time consumed by a pre-evaluation process exceeds 10 minutes. The pre-evaluation process may be understood as the process in which the first network element determines, based on the first information, the result information corresponding to the pre-evaluation type.

For example, the intent target includes a first operation. The first operation may be all operations associated with the intent target. The first operation may be obtained by the first network element from another network element, or may be determined by the first network element based on the intent target. The first operation may be an operation set list, and the operation set list includes one or more operations. For example, the first operation is an operation set 1, and the operation set 1 includes an operation 1, an operation 2, and an operation 3.

Step S703: A third network element sends the first information to the first network element.

Step S704: The first network element receives the first information from the third network element.

For example, the third network element may be one or more network elements. The first information includes one or more of the following: operation impact information or first KPI impact information. The operation impact information indicates mutual exclusion information of the first operation, and the first KPI impact information indicates impact of the first operation on a KPI associated with the intent target or impact of the first operation on the network KPI.

For example, the mutual exclusion information of the first operation includes identification information of mutually exclusive operations, or indication information indicating whether there is mutual exclusion. In other words, if the first operation includes a plurality of operations, the identification information of the mutually exclusive operations may be identification information of mutually exclusive operations in the plurality of operations. For example, the first operation includes an operation 1, an operation 2, and an operation 3, and identification information of the operation 1, the operation 2, and the operation 3 is an identifier 1, an identifier 2, and an identifier 3. If the operation 1 and the operation 3 are mutually exclusive, the identification information of the mutually exclusive operations is the identifier 1 and the identifier 3.

For example, the impact of the first operation on the KPI associated with the intent target may be impact of the first operation on a KPI associated with the intent target in the network KPJ. The impact of the first operation on the KPI associated with the intent target may be positive impact or negative impact. For example, it is assumed that the KPI associated with the intent target is a rate, the first operation includes an operation 1 and an operation 2, the operation 1 may increase the rate by 3%, and the operation 2 may increase the rate by 5%. For example, it is assumed that the KPI associated with the intent target is a rate, the first operation includes an operation 1 and an operation 2, the operation 1 may increase the rate by 3%, and the operation 2 may decrease the rate by 5%. The impact of the first operation on the network KPI may also be positive impact or negative impact. For example, it is assumed that the network KPI includes a rate and a latency, the first operation includes an operation 1 and an operation 2, the operation 1 may increase the rate by 1% and decrease the latency by 1%, and the operation 2 may increase the rate by 5% and decrease the latency by 1%. For example, it is assumed that the network KPI includes a rate and a latency, the first operation includes an operation 1 and an operation 2, the operation 1 may increase the rate by 1% and decrease the latency by 1%, and the operation 2 may decrease the rate by 5% and increase the latency by 5%.

For example, the first information further includes one or more of the following: network performance data information, information about effective time of the first operation, and information about another intent target other than the intent target. The network performance data information is information representing network performance, for example, a latency, a throughput rate, a rate, PRB utilization, a jitter, an RRC setup success rate, a QoS flow setup success rate, a call setup success rate, a radio call drop rate, an intra-frequency handover success rate, an inter-frequency handover success rate, CPU utilization, a cell availability ratio, a radio network availability ratio, uplink traffic of a data service, downlink traffic of a data service, an average quantity of users, a maximum quantity of users, uplink interference noise, a PSCell change success rate, a total quantity of packets of a PDU, a total data volume of a PDU, a coverage curve, an RSRP average value, an SINR average value, a base station energy efficiency value, or a base station energy efficiency level. The third network element may be a plurality of network elements, for example, the third network element is three network elements: a network element 1, a network element 2, and a network element 3. The operation impact information, the first KPI impact information, and the information about the effective time of the first operation may be from the network element 1, the network performance data information may be from the network element 2, and the information about the another intent target other than the intent target may be from the network element 3.

The network performance data information may be determined by the third network element based on the first operation or based on context information of the intent target. The context information of the intent target may be determined by the first network element based on the identifier of the intent target, and then the first network element sends the context information of the intent target to the third network element. After receiving the network performance data information, the first network element may monitor the pre-evaluation process based on the network performance data information. For example, it is assumed that the first network element further receives the pre-evaluation termination condition from the second network element, where the pre-evaluation termination condition is that pre-evaluation is stopped if a pre-evaluation process occupies more than 70% of system resources. If the network performance data information is that the pre-evaluation process occupies 80% of the system resources, the first network element stops pre-evaluation. The information about the effective time of the first operation may mean an effective duration of the first operation, or may mean effective start time and effective end time of the first operation.

The information about the another intent target other than the intent target may be used to check an intent conflict between the intent target and the another intent target.

Step S705: The first network element determines, based on the first information, the result information corresponding to the pre-evaluation type.

For example, the result information includes pre-evaluation information of an intent achievement result or pre-evaluation information of impact on a KPI. The pre-evaluation information of the intent achievement result may indicate whether an intent can be achieved. When the pre-evaluation type is the pre-evaluation information of the intent achievement result, the first network element may determine the result information based on the operation impact information, where the result information includes the pre-evaluation information of the intent achievement result. For example, it is assumed that the pre-evaluation type is the pre-evaluation information of the intent achievement result, the first operation includes an operation 1 and an operation 2, the operation impact information is indication information, and the indication information indicates that the operation 1 and the operation 2 are mutually exclusive. In this case, the first network element determines, based on the operation impact information, that the result information is that the intent cannot be achieved.

When the pre-evaluation type is the pre-evaluation information of the impact on the network KPI, the first network element may determine the result information based on the first KPI impact information, where the result information includes the pre-evaluation information of the impact on the KPI. For example, it is assumed that the pre-evaluation type is the pre-evaluation information of the impact on the network KPI, the first KPI impact information indicates the impact of the first operation on the KPI associated with the intent target, the first operation includes an operation 1 and an operation 2, the intent target is to increase a rate by 10%, and the first KPI impact information may mean that the operation 1 can increase the rate by 3% and the operation 2 can increase the rate by 5%. In this case, the first network element determines the result information based on the first KPI impact information, where the result information includes the pre-evaluation information of the impact on the KPI, that is, the operation 1 can increase the rate by 3% and the operation 2 can increase the rate by 5%. For example, it is assumed that the pre-evaluation type is the pre-evaluation information of the impact on the network KPI, the first KPI impact information indicates the impact of the first operation on the network KPI, the first operation includes an operation 1, the network KPI includes a rate and a throughput rate, and the first KPI impact information may mean that the operation 1 can increase the rate by 3% and increase the throughput rate by 2%. In this case, the first network element determines the result information based on the first KPI impact information, where the result information includes the pre-evaluation information of the impact on the KPI, that is, the operation 1 can increase the rate by 3% and increase the throughput rate by 2%.

For example, if the result information includes the pre-evaluation information of the intent achievement result, the result information further includes one or more of the following: confidence of the result information, a duration required for achieving the intent target, or a reason why the intent target is not achieved. The confidence of the result information may further mean a trust degree of the result information, that is, a probability that the result information is considered to be accurate. For example, if the confidence is 90%, it indicates that there is a probability of 90% that the result information is considered to be accurate.

For example, if the result information includes the pre-evaluation information of the impact on the KPI, the result information further includes one or more of the following: the confidence of the result information, a KPI list corresponding to the pre-evaluation information of the impact on the KPI, and confidence of the pre-evaluation information of the impact on the KPI.

Step S706: The first network element sends the result information to the second network element.

Step S707: The second network element receives the result information from the first network element.

In the method shown in FIG. 7, the second network element sends the intent target and the pre-evaluation type to the first network element. Correspondingly, the first network element determines, based on the first information, the result information corresponding to the pre-evaluation type, and sends the result information to the second network element. The result information includes the pre-evaluation information of the intent achievement result and the pre-evaluation information of the impact on the KPI. In this way, whether an intent can be completed can be learned or impact of intent implementation on a network can be learned of without modifying a network status. This helps the second network element use this case as a reference, and improve intent execution efficiency.

Figure 8:
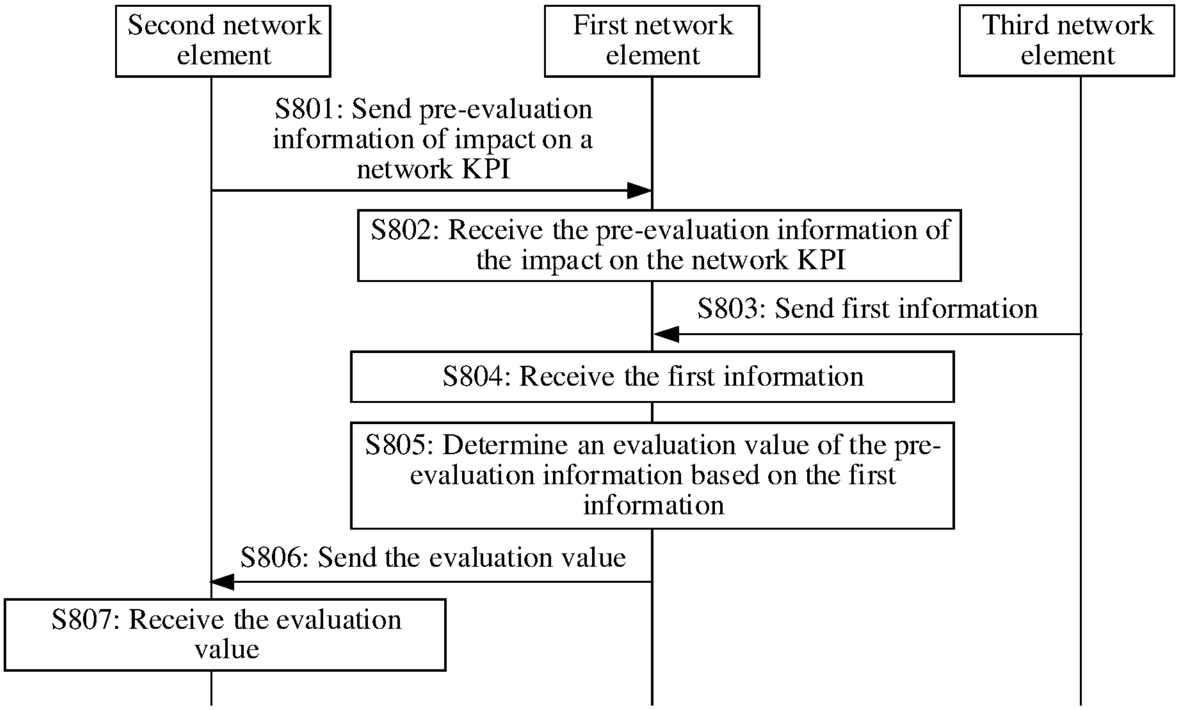
FIG. 8 is a schematic flowchart of an example intent pre-evaluation method according to an embodiment of this application.

FIG. 8 shows an example intent pre-evaluation method according to an embodiment of this application. The method includes but is not limited to the following steps.

Step S801: A second network element sends pre-evaluation information of impact on a network KPI to a first network element.

Step S802: The first network element receives the pre-evaluation information of the impact on the network KPI from the second network element.

The pre-evaluation information of the impact on the network KPI may be a target name (targetName), for example, a latency, a rate, or a throughput rate, but does not include a target value (targetValue) corresponding to the target name. For example, the pre-evaluation information of the impact on the network KPI may be a throughput rate, and targetName thereof is "Object". For example, the pre-evaluation information of the impact on the network KPI may be a latency, and targetName thereof is "Latency".

For example, the network KPI includes one or more of the following: a latency, a throughput rate, a rate, PRB utilization, a jitter, an RRC setup success rate, a QoS flow setup success rate, a call setup success rate, a radio call drop rate, an intra-frequency handover success rate, an inter-frequency handover success rate, CPU utilization, a cell availability ratio, a radio network availability ratio, uplink traffic of a data service, downlink traffic of a data service, an average quantity of users, a maximum quantity of users, uplink interference noise, a PSCell change success rate, a total quantity of packets of a PDU, a total data volume of a PDU, a coverage curve, an RSRP average value, an SINR average value, a base station energy efficiency value, or a base station energy efficiency level.

For example, the first network element further receives one or more of the following from the second network element: a pre-evaluation constraint condition, a pre-evaluation termination condition, or a maximum pre-evaluation duration, where the pre-evaluation constraint condition indicates a constraint in performing a process of determining, based on first information, an evaluation value corresponding to the pre-evaluation information; the pre-evaluation termination condition is used to determine whether to continue or terminate a process of determining, based on first information, an evaluation value corresponding to the pre-evaluation information; and the maximum pre-evaluation duration is used to determine whether to continue or terminate a process of determining, based on first information, an evaluation value corresponding to the pre-evaluation information. For example, it is assumed that the pre-evaluation information that is of the impact on the network KPI and that is sent by the second network element may be a throughput rate, targetName thereof is "Object", and the second network element expects that an action area of the throughput rate is returned, for example, "Jingiao". The pre-evaluation constraint condition may be "Object is a place in {Zhangjiang, Jinqiao, Lujiazui} in which a primary device that increases a throughput rate by 10% and that has a minimum change can increase a throughput rate in Pudong by 5%". Correspondingly, the first network element is limited by the pre-evaluation constraint condition when performing the process of determining, based on the first information, the evaluation value corresponding to the pre-evaluation information, and the evaluation value is one of "Zhangjiang, Jinqiao, and Lujiazui". For example, the first network element further receives the pre-evaluation termination condition from the second network element, where the pre-evaluation termination condition is that pre-evaluation is stopped if a pre-evaluation process occupies more than 70% of system resources. For example, the first network element further receives the maximum pre-evaluation duration from the second network element, where the maximum pre-evaluation duration means that pre-evaluation is stopped if time consumed by a pre-evaluation process exceeds 10 minutes. The pre-evaluation process may be understood as the process in which the first network element determines, based on the first information, the evaluation value corresponding to the pre-evaluation information.

Step S803: A third network element sends the first information to the first network element.

Step S804: The first network element receives the first information from the third network element.

For example, the first information includes one or more of the following: operation impact information or second KPI impact information, the operation impact information indicates mutual exclusion information of a second operation, the second KPI impact information indicates impact of the second operation on the network KPI, and the second operation is an operation that affects the network KPI. The network KPI in the sentence that the second operation is an operation that affects the network KPI may be a network KPI corresponding to the pre-evaluation information of the impact on the network KPI. For example, if the pre-evaluation information of the impact on the network KPI is a throughput rate, the second operation is an operation that affects the throughput rate.

For example, the mutual exclusion information of the second operation includes identification information of mutually exclusive operations, or indication information indicating whether there is mutual exclusion. In other words, if the second operation includes a plurality of operations, the identification information of the mutually exclusive operations may be identification information of mutually exclusive operations in the plurality of operations. For example, the second operation includes an operation 1, an operation 2, and an operation 3, and identification information of the operation 1, the operation 2, and the operation 3 is an identifier 1, an identifier 2, and an identifier 3. If the operation 1 and the operation 3 are mutually exclusive, the identification information of the mutually exclusive operations is the identifier 1 and the identifier 3.

For example, the impact of the second operation on the network KPI may also be positive impact or negative impact. For example, it is assumed that the network KPI includes a throughput rate, the second operation that affects the throughput rate includes an operation 1 and an operation 2, the operation 1 can increase the throughput rate by 1%, and the operation 2 can increase the throughput rate by 3%. For example, it is assumed that the network KPI includes a throughput rate, the second operation that affects the throughput rate includes an operation 1 and an operation 2, the operation 1 can decrease the throughput rate by 1%, and the operation 2 can decrease the throughput rate by 5%.

For example, the first information further includes one or more of the following: network performance data information, effective time of the second operation, and information about an intent corresponding to another network KPI other than the network KPI. The third network element may be a plurality of network elements, for example, the third network element is three network elements: a network element 1, a network element 2, and a network element 3. The operation impact information, the second KPI impact information, and the information about the effective time of the second operation may be from the network element 1, the network performance data information may be from the network element 2, and the information about the intent corresponding to the another network KPI other than the network KPI may be from the network element 3.

Step S805: The first network element determines, based on the first information, the evaluation value corresponding to the pre-evaluation information.

For example, in addition to determining, based on the first information, the evaluation value corresponding to the pre-evaluation information, the first network element may further determine confidence of the evaluation value. The confidence of the evaluation value may also be understood as a trust degree of the evaluation value.

For example, the first network element determines the pre-evaluation information based on the operation impact information and the second KPI impact information. For example, it is assumed that the network KPI includes a throughput rate, the second operation that affects the throughput rate includes an operation 1 and an operation 2, the operation impact information is that the operation 1 and the operation 2 are mutually exclusive, and the second KPI impact information may mean that the operation 1 can increase the throughput rate by 1% and the operation 2 can increase the throughput rate by 3%. Because 3% by which the operation 2 increases the throughput rate is greater than 1% by which the operation 1 increases the throughput rate, the first network element determines that the evaluation value corresponding to the pre-evaluation information is 3%.

For example, the first network element determines, based on the second KPI impact information, the evaluation value corresponding to the pre-evaluation information. For example, it is assumed that the network KPI includes a throughput rate, the second operation that affects the throughput rate includes an operation 1 and an operation 2, and the second KPI impact information may mean that the operation 1 can increase the throughput rate by 1% and the operation 2 can increase the throughput rate by 3%. Because 3% by which the operation 2 increases the throughput rate is greater than 1% by which the operation 1 increases the throughput rate, the first network element determines that the evaluation value corresponding to the pre-evaluation information is 3%.

Step S806: The first network element sends the evaluation value to the second network element.

For example, in addition to sending the evaluation value to the second network element, the first network element may further send the confidence corresponding to the evaluation value and the pre-evaluation information of the impact on the network KPI. For example, <object, 3%, 80%> is sent, where object means targetName of the pre-evaluation information of the impact on the network KPI, 3% means the evaluation value corresponding to the pre-evaluation information, and 80% means the confidence corresponding to the evaluation value.

Step S807: The second network element receives the evaluation value from the first network element.

In the method described in FIG. 8, the second network element sends the pre-evaluation information of the impact on the network KPI to the first network element. Correspondingly, the first network element determines the evaluation value of the pre-evaluation information based on the first information, and sends the evaluation value to the second network element. In this way, the evaluation value can be fed back without modifying a network status. This helps the second network element use this case as a reference, and improve intent execution efficiency.

Figure 9A:
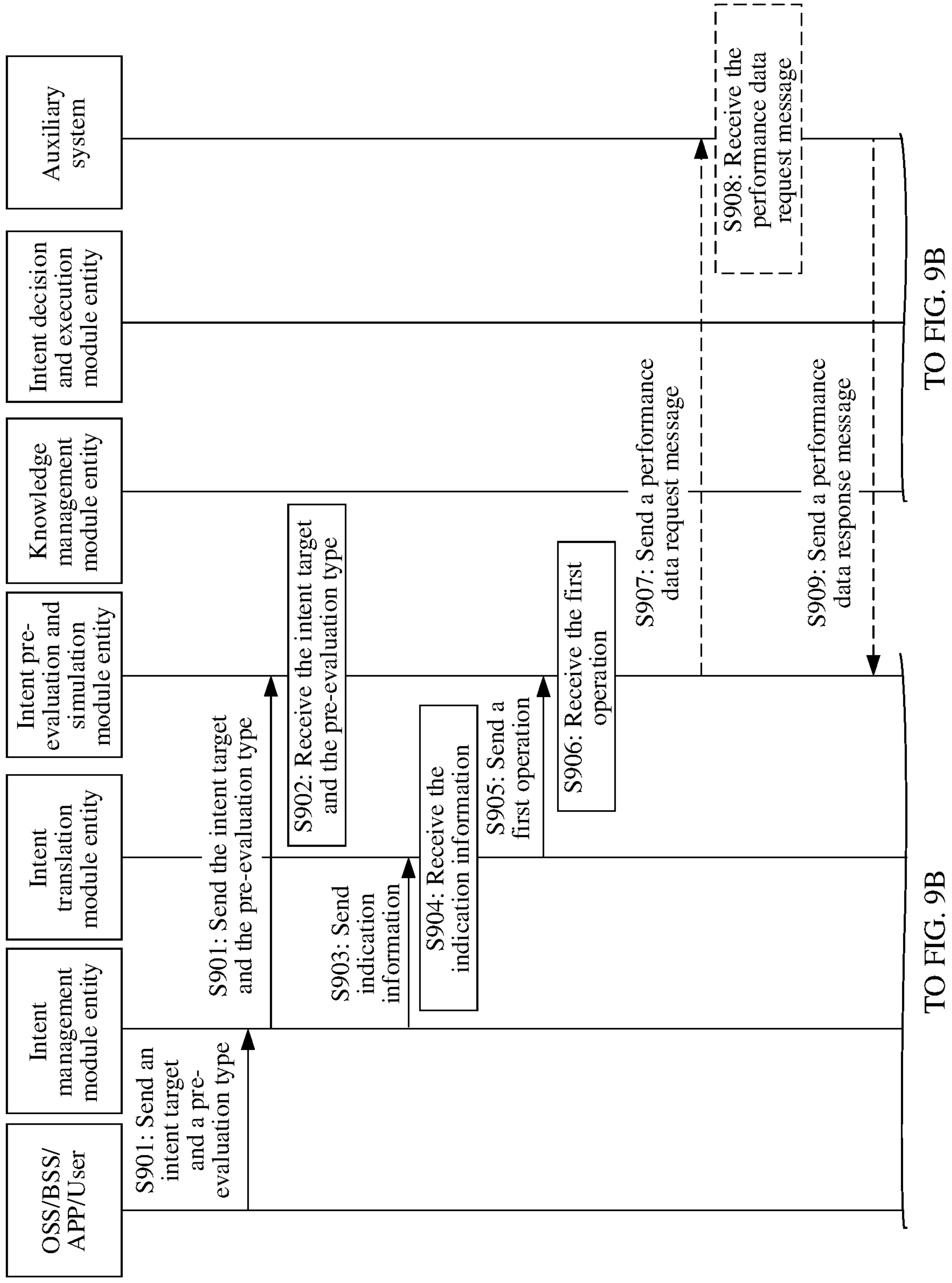
FIG. 9A to FIG. 9C are a schematic flowchart of an example intent pre-evaluation method according to an embodiment of this application.
Figure 9B:
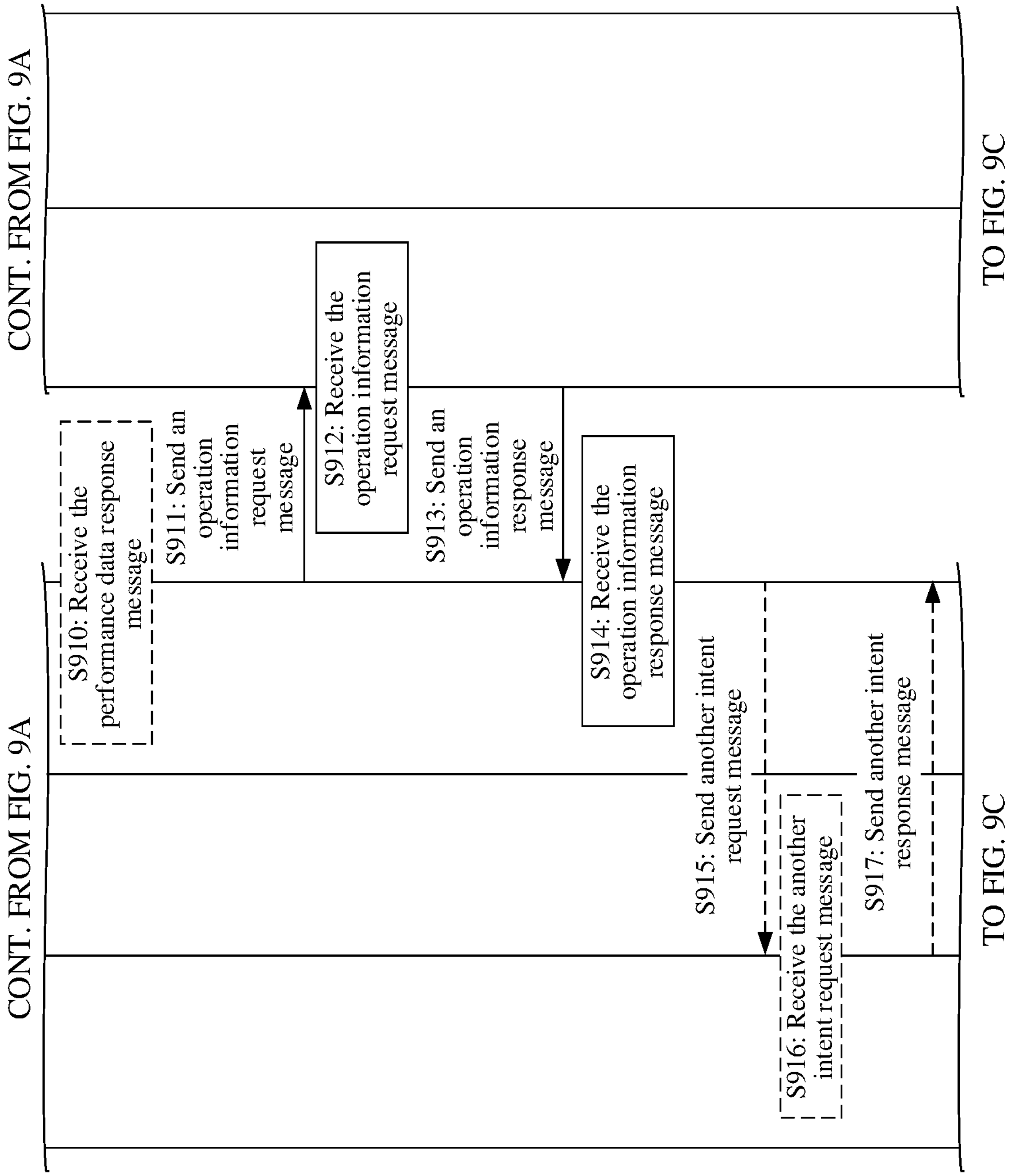
Figure 9C:
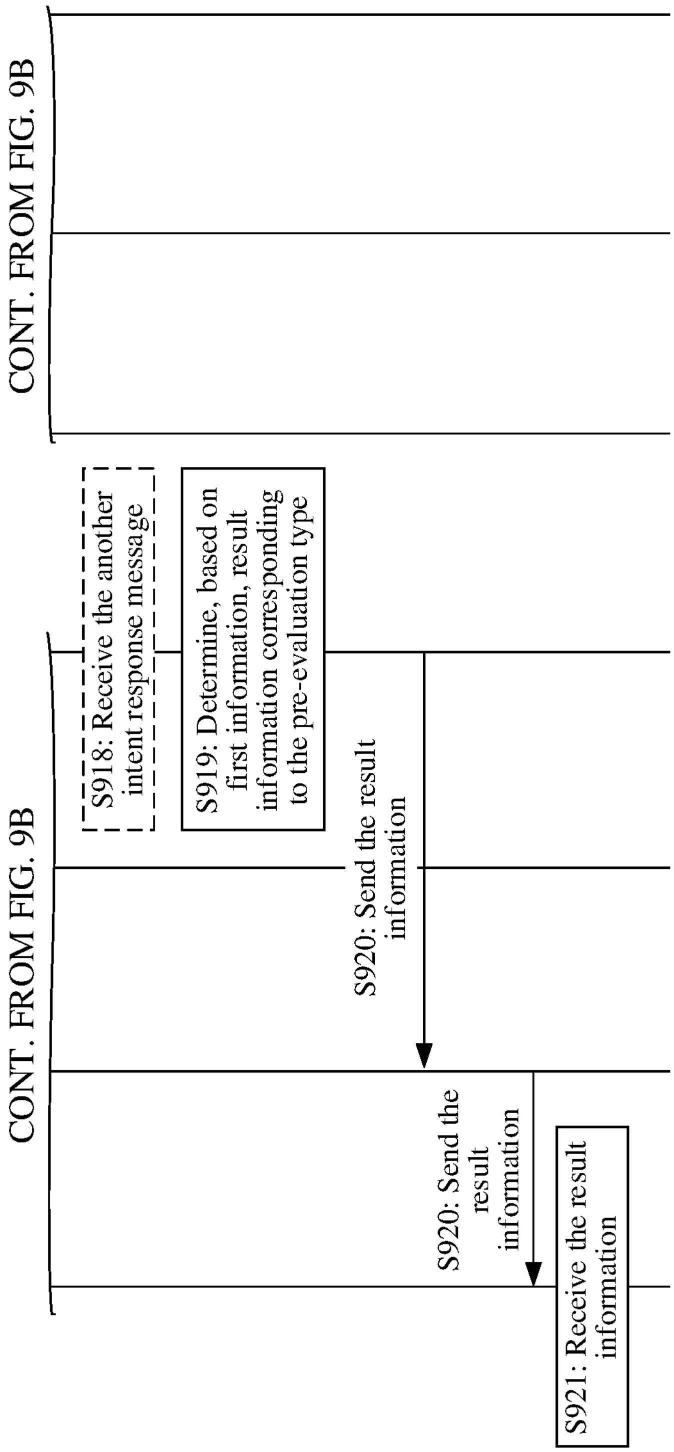

A system architecture to which an embodiment in FIG. 9A to FIG. 9C is applicable may include: an intent pre-evaluation and simulation module entity, a knowledge management module entity, an intent management module entity, an intent translation module entity, and an auxiliary system in a wIDN system, and a BSS/OSS/APP/User. A correspondence between the system architecture and the first network element, the second network element, and the third network element is as follows: The first network element is the intent pre-evaluation and simulation module entity in the wIDN system shown in FIG. 3, the third network element is the knowledge management module entity, the intent management module entity, the intent translation module entity, and the auxiliary system in the wIDN system shown in FIG. 3, and the second network element is a network element in the BSS/OSS/APP/User.

FIG. 9A to FIG. 9C show an example intent pre-evaluation method according to an embodiment of this application. The method includes but is not limited to the following steps.

Step S901: The BSS/OSS/APP/User sends an intent target and a pre-evaluation type to the intent pre-evaluation and simulation module entity through the intent management module entity.

For example, the BSS/OSS/APP/User may further send one or more of the following to the intent pre-evaluation and simulation module entity through the intent management module entity: a pre-evaluation termination condition or a maximum pre-evaluation duration.

Step S902: The intent pre-evaluation and simulation module entity receives the intent target and the pre-evaluation type from the BSS/OSS/APP/User through the intent management module entity.

For example, the intent pre-evaluation and simulation module entity receives one or more of the following from the BSS/OSS/APP/User through the intent management module entity: the pre-evaluation termination condition or the maximum pre-evaluation duration.

For example, the intent target includes an identifier (targetName) of the intent target and/or a target value (targetValue) of the intent target. The pre-evaluation type includes pre-evaluation information of an intent achievement result or pre-evaluation information of impact on a network key performance indicator (KPI). The intent target and the pre-evaluation type may be carried in an intent creation message. For details, refer to step S702.

Step S903: The intent management module entity sends indication information to the intent translation module entity.

For example, the indication information indicates the intent translation module entity to send a first operation to the intent pre-evaluation and simulation module entity. For example, in addition to sending the indication information to the intent translation module entity, the intent management module entity further sends the intent target. Certainly, the indication information and the intent target may be carried in one message.

Step S904: The intent translation module entity receives the indication information from the intent management module entity.

Step S905: The intent translation module entity sends the first operation to the intent pre-evaluation and simulation module entity.

For example, the first operation is determined by the intent translation module entity based on the intent target.

Step S906: The intent pre-evaluation and simulation module entity receives the first operation from the intent translation module entity.

Step S907: The intent pre-evaluation and simulation module entity sends a performance data request message to the auxiliary system.

This step is an optional step, and the performance data request message includes the first operation. The performance data request message may also be a measurement task request message.

Step S908: The auxiliary system receives the performance data request message from the intent pre-evaluation and simulation module entity.

This step is an optional step.

Step S909: The auxiliary system sends a performance data response message to the intent pre-evaluation and simulation module entity.

This step is an optional step. For example, the performance data response message includes network performance data information, and the network performance data information is determined based on the first operation. The network performance data information is the network performance data information in the first information in the embodiment in FIG. 7. For details, refer to step S704. The performance data response message may be a measurement task response message.

Step S910: The intent pre-evaluation and simulation module entity receives the performance data response message from the auxiliary system.

This step is an optional step. The intent pre-evaluation and simulation module entity sends the performance data request message to the auxiliary system. Correspondingly, the auxiliary system sends the performance data response message to the intent pre-evaluation and simulation module entity based on the performance data request message. This manner can assist in determining the pre-evaluation termination condition and the maximum pre-evaluation duration, and can make a value of the network KPI more accurate.

Step S911: The intent pre-evaluation and simulation module entity sends an operation information request message to the knowledge management module entity.

Step S912: The knowledge management module entity receives the operation information request message from the intent pre-evaluation and simulation module entity.

For example, the operation information request message includes an identifier of the first operation.

Step S913: The knowledge management module entity sends an operation information response message to the intent pre-evaluation and simulation module entity.

Step S914: The intent pre-evaluation and simulation module entity receives the operation information response message from the knowledge management module entity.

For example, the operation information response message includes operation impact information or first KPI impact information. The operation impact information indicates mutual exclusion information of the first operation, and the first KPI impact information indicates impact of the first operation on a KPI associated with the intent target or impact of the first operation on the network KPI. For example, the operation information response information may further include information about effective time of the first operation. The operation impact information, the first KPI impact information, and the information about the effective time of the first operation are the operation impact information, the first KPI impact information, and the information about the effective time of the first operation in the first information in the embodiment in FIG. 7. For details, refer to step S704.

Step S915: The intent pre-evaluation and simulation module entity sends another intent request message to the intent management module entity.

This step is an optional step.

Step S916: The intent management module entity receives the another intent request message from the intent pre-evaluation and simulation module entity.

This step is an optional step.

Step S917: The intent management module entity sends another intent response message to the intent pre-evaluation and simulation module entity.

This step is an optional step.

Step S918: The intent pre-evaluation and simulation module entity receives the another intent response message from the intent management module entity.

This step is an optional step. For example, the another intent response message includes information about another intent target other than the intent target. The information about the another intent target other than the intent target is the information about the another intent target other than the intent target in the first information in the embodiment in FIG. 7. For details, refer to step S704.

The intent pre-evaluation and simulation module entity sends the another intent request message to the intent management module entity, and correspondingly, the intent management module entity sends the another intent response message to the intent pre-evaluation and simulation module entity based on the another intent request message. This manner can assist an intent system in intent conflict detection, to improve system performance.

Step S919: The intent pre-evaluation and simulation module entity determines, based on first information, result information corresponding to the pre-evaluation type.

For example, the first information includes one or more of the following: operation impact information or first KPI impact information. The first information further includes one or more of the following: network performance data information, information about effective time of the first operation, and information about another intent target other than the intent target. For details, refer to step S705.

Step S920: The intent pre-evaluation and simulation module sends the result information to the BSS/OSS/APP/User through the intent management module entity.

Step S921: The BSS/OSS/APP/User receives the result information from the intent pre-evaluation and simulation module entity through the intent management module entity.

Certainly, the intent translation module entity and the intent pre-evaluation module entity shown in FIG. 9A to FIG. 9C may be integrated into one module entity, for example, an intent translation and pre-evaluation module entity. The intent translation and pre-evaluation module entity can implement functions implemented by both the intent translation module entity and the intent pre-evaluation module entity.

Figure 10A:
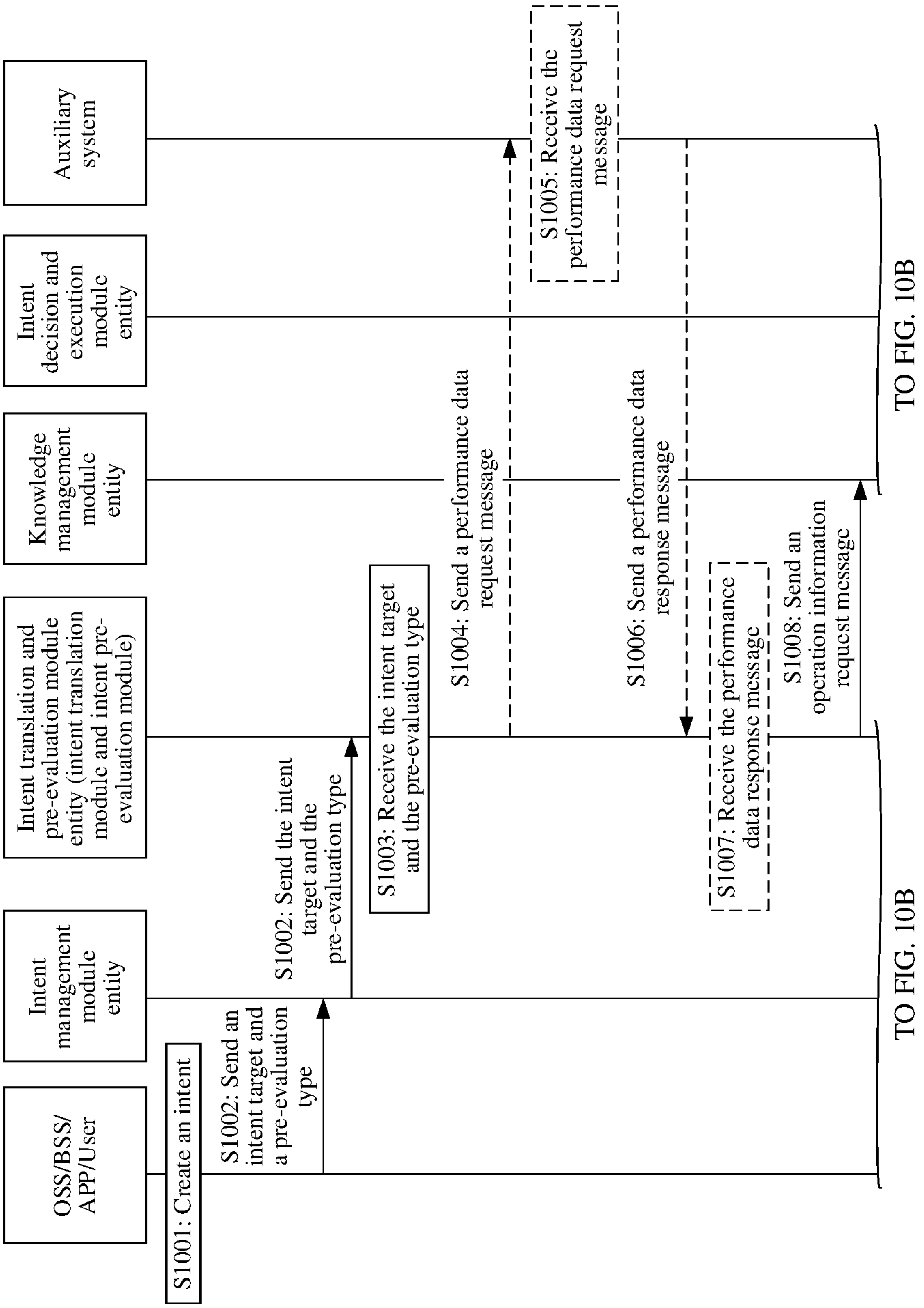
FIG. 10A and FIG. 10 are a schematic flowchart of an example intent pre-evaluation method according to an embodiment of this application.
Figure 10B:
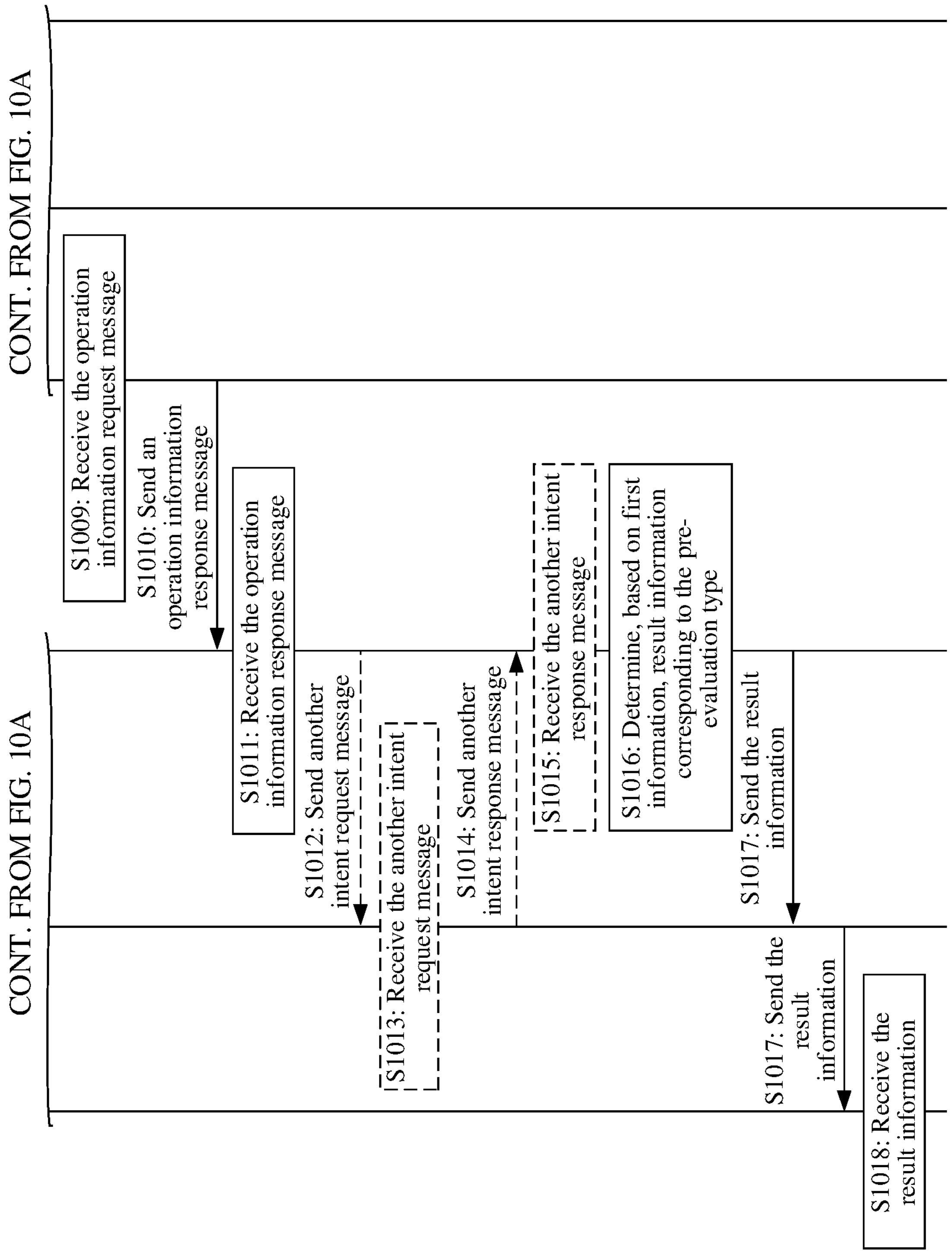

A system architecture to which an embodiment in FIG. 10A and FIG. 10B is applicable may include: an intent translation and pre-evaluation module entity, a knowledge management module entity, an intent management module entity, and an auxiliary system in a wIDN system, and a BSS/OSS/APP/User. A correspondence between the system architecture and the first network element, the second network element, and the third network element is as follows: The first network element is the intent translation and pre-evaluation module entity in the wIDN system. The intent translation and pre-evaluation module entity is a module entity integrating functions of an intent pre-evaluation and simulation module and an intent translation module. The third network element is the knowledge management module entity, the intent management module entity, and the auxiliary system in the wIDN system shown in FIG. 3. The second network element is a network element in the BSS/OSS/APP/User.

Step S1001: The BSS/OSS/APP/User creates an intent.

Step S1002: The BSS/OSS/APP/User sends an intent target and a pre-evaluation type to the intent translation and pre-evaluation module entity through the intent management module entity.

For example, the BSS/OSS/APP/User may further send one or more of the following to the intent translation and pre-evaluation module entity through the intent management module entity: a pre-evaluation termination condition or a maximum pre-evaluation duration.

Step S1003: The intent translation and pre-evaluation module entity receives the intent target and the pre-evaluation type from the BSS/OSS/APP/User through the intent management module entity.

For example, the intent translation and pre-evaluation module entity may further receive one or more of the following from the BSS/OSS/APP/User through the intent management module entity: the pre-evaluation termination condition or the maximum pre-evaluation duration.

Step S1004: The intent translation and pre-evaluation module entity sends a performance data request message to the auxiliary system.

This step is an optional step. The performance data request message includes context information of the intent. The context information of the intent is determined by the intent translation and pre-evaluation module entity based on the intent target. The context information of the intent includes a first operation. The performance data request message may be a measurement task request message.

Step S1005: The auxiliary system receives the performance data request message from the intent translation and pre-evaluation module entity.

This step is an optional step.

Step S1006: The auxiliary system sends a performance data response message to the intent translation and pre-evaluation module entity.

This step is an optional step. For example, the performance data response message includes network performance data information, and the network performance data information is determined based on the first operation. The network performance data information is the network performance data information in the first information in the embodiment in FIG. 7. For details, refer to step S704. The performance data response message may be a measurement task response message.

Step S1007: The intent translation and pre-evaluation module entity receives the performance data response message from the auxiliary system.

This step is an optional step. The intent translation and pre-evaluation module entity sends the performance data request message to the auxiliary system. Correspondingly, the auxiliary system sends the performance data response message to the intent translation and pre-evaluation module entity based on the performance data request message. This manner can assist in determining the pre-evaluation termination condition and the maximum pre-evaluation duration, and can make a value of the network KPI more accurate.

Step S1008: The intent translation and pre-evaluation module entity sends an operation information request message to the knowledge management module entity.

Step S1009: The knowledge management module entity receives the operation information request message from the intent translation and pre-evaluation module entity.

For example, the operation information request message includes an identifier of the first operation.

Step S1010: The knowledge management module entity sends an operation information response message to the intent translation and pre-evaluation module entity.

Step S1011: The intent translation and pre-evaluation module entity receives the operation information response message from the knowledge management module entity.

For example, the operation information response message includes operation impact information or first KPI impact information. The operation impact information indicates mutual exclusion information of the first operation, and the first KPI impact information indicates impact of the first operation on a KPI associated with the intent target or impact of the first operation on the network KPI. For example, the operation information response message may further include information about effective time of the first operation. The operation impact information, the first KPI impact information, and the information about the effective time of the first operation are the operation impact information, the first KPI impact information, and the information about the effective time of the first operation in the first information in the embodiment in FIG. 7. For details, refer to step S704.

Step S1012: The intent translation and pre-evaluation module entity sends another intent request message to the intent management module entity.

This step is an optional step.

Step S1013: The intent management module entity receives the another intent request message from the intent translation and pre-evaluation module entity.

This step is an optional step.

Step S1014: The intent management module entity sends another intent response message to the intent translation and pre-evaluation module entity.

This step is an optional step.

Step S1015: The intent translation and pre-evaluation module entity receives the another intent response message from the intent management module entity.

This step is an optional step. For example, the another intent response message includes information about another intent target other than the intent target. The information about the another intent target other than the intent target is the information about the another intent target other than the intent target in the first information in the embodiment in FIG. 7. For details, refer to step S704.

The intent translation and pre-evaluation module entity sends the another intent request message to the intent management module entity, and correspondingly, the intent management module entity sends the another intent response message to the intent translation and pre-evaluation module entity based on the another intent request message. This manner can assist an intent system in intent conflict detection, to improve system performance.

Step S1016: The intent translation and pre-evaluation module entity determines, based on first information, result information corresponding to the pre-evaluation type.

For example, the first information includes one or more of the following: operation impact information or first KPI impact information. The first information further includes one or more of the following: network performance data information, information about effective time of the first operation, and information about another intent target other than the intent target. For details, refer to step S705.

Step S1017: The intent translation and pre-evaluation module entity sends the result information to the BSS/OSS/APP/User through the intent management module entity.

Step S1018: The BSS/OSS/APP/User receives the result information from the intent translation and pre-evaluation module entity through the intent management module entity.

Certainly, the intent translation and pre-evaluation module entity shown in FIG. 10A and FIG. 10B may alternatively be split into an intent translation module entity and an intent pre-evaluation module entity.

Figure 11A:
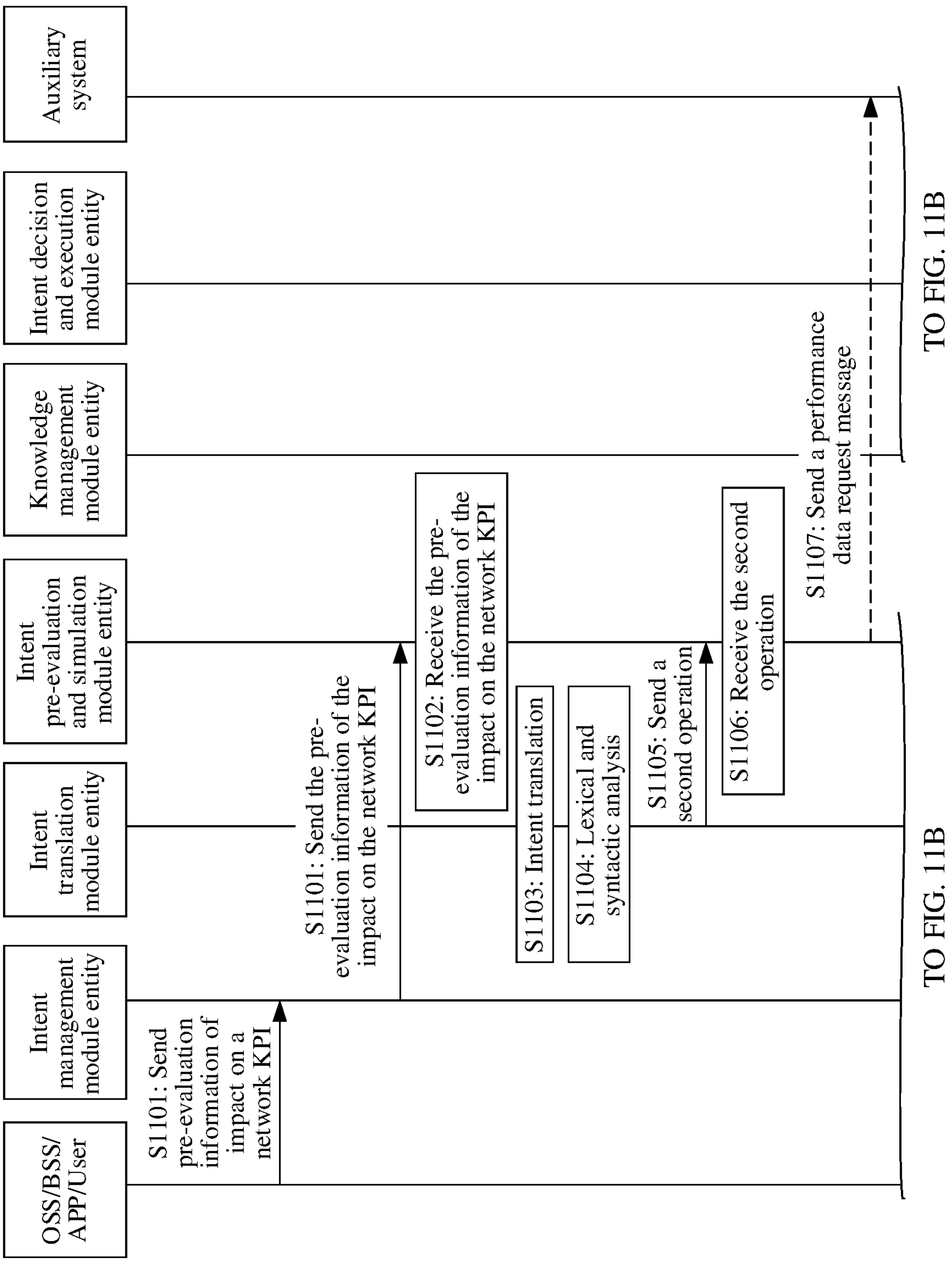
FIG. 11A to FIG. 11C are a schematic flowchart of an example intent pre-evaluation method according to an embodiment of this application.
Figure 11B:
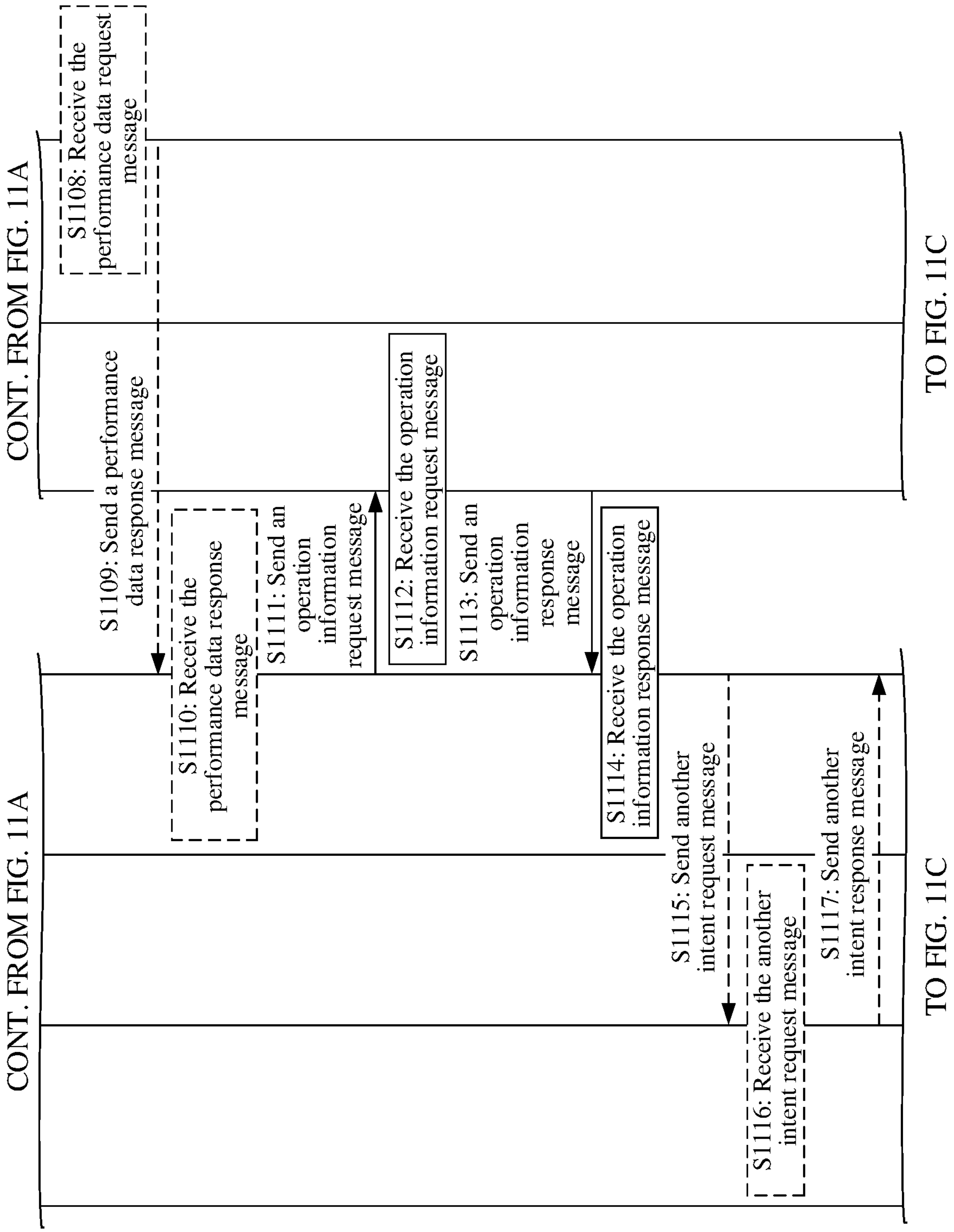
Figure 11C:
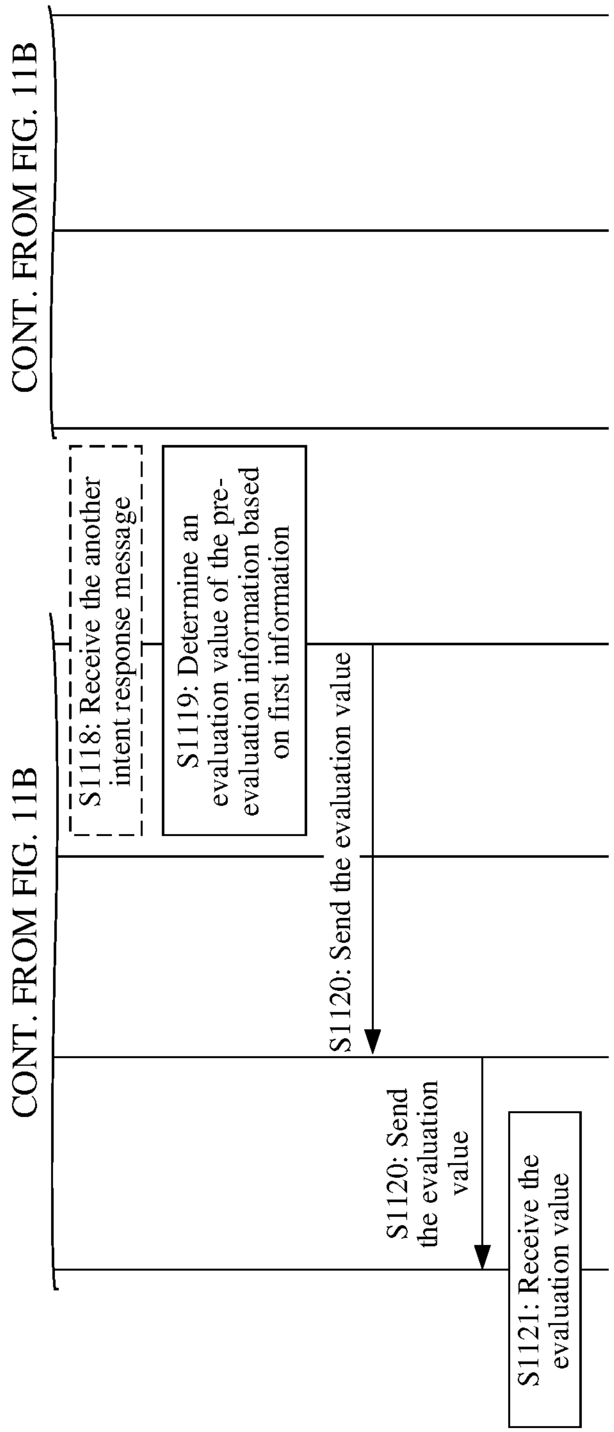

A system architecture to which an embodiment in FIG. 11A to FIG. 11C is applicable may include: an intent pre-evaluation and simulation module entity, a knowledge management module entity, an intent management module entity, an intent translation module entity, and an auxiliary system in a wIDN system, and a BSS/OSS/APP/User. A correspondence between the system architecture and the first network element, the second network element, and the third network element is as follows: The first network element is the intent pre-evaluation and simulation module entity in the wIDN system shown in FIG. 3, the third network element is the knowledge management module entity, the intent management module entity, the intent translation module entity, and the auxiliary system in the wIDN system shown in FIG. 3, and the second network element is a network element in the BSS/OSS/APP/User.

Step S1101: The BSS/OSS/APP/User sends pre-evaluation information of impact on a network KPI to the intent pre-evaluation and simulation module entity through the intent management module entity.

For example, the BSS/OSS/APP/User may further send one or more of the following to the intent pre-evaluation and simulation module entity through the intent management module entity: a pre-evaluation constraint condition, a pre-evaluation termination condition, or a maximum pre-evaluation duration.

Step S1102: The intent pre-evaluation and simulation module entity receives the pre-evaluation information of the impact on the network KPI from the BSS/OSS/APP/User through the intent management module entity.

For example, the intent pre-evaluation and simulation module entity receives one or more of the following from the BSS/OSS/APP/User through the intent management module entity: the pre-evaluation constraint condition, the pre-evaluation termination condition, or the maximum pre-evaluation duration. For details, refer to step S802.

Step S1103: The intent translation module entity performs intent translation.

For example, before performing intent translation, the intent translation module entity may receive indication information from the intent management module entity. The indication information may include the pre-evaluation information of the impact on the network KPI. That the intent translation module entity performs intent translation may mean that the intent translation module entity determines a second operation based on the pre-evaluation information of the impact on the network KPI, where the second operation is an operation that affects the network KPI.

Step S1104: The intent translation module entity performs lexical and syntactic analysis.

Step S1105: The intent translation module entity sends the second operation to the intent pre-evaluation and simulation module entity.

For example, identification information of the second operation is sent.

Step S1106: The intent pre-evaluation and simulation module entity receives the second operation from the intent translation module entity.

Step S1107: The intent pre-evaluation and simulation module entity sends a performance data request message to the auxiliary system.

This step is an optional step, and the performance data request message includes the second operation. The performance data request message may be a measurement task request message.

Step S1108: The auxiliary system receives the performance data request message from the intent pre-evaluation and simulation module entity.

This step is an optional step.

Step S1109: The auxiliary system sends a performance data response message to the intent pre-evaluation and simulation module entity.

This step is an optional step. For example, the performance data response message includes network performance data information, and the network performance data information is determined based on the second operation. The network performance data information is the network performance data information in the first information in the embodiment in FIG. 8. For details, refer to step S804. The performance data response message may be a measurement task response message.

Step S1110: The intent pre-evaluation and simulation module entity receives the performance data response message from the auxiliary system.

This step is an optional step. The intent pre-evaluation and simulation module entity sends the performance data request message to the auxiliary system. Correspondingly, the auxiliary system sends the performance data response message to the intent pre-evaluation and simulation module entity based on the performance data request message. This manner can assist in determining the pre-evaluation termination condition and the maximum pre-evaluation duration, and can make a value of the network KPI more accurate.

Step S1111: The intent pre-evaluation and simulation module entity sends an operation information request message to the knowledge management module entity.

Step S1112: The knowledge management module entity receives the operation information request message from the intent pre-evaluation and simulation module entity.

For example, the operation information request message includes an identifier of the second operation.

Step S1113: The knowledge management module entity sends an operation information response message to the intent pre-evaluation and simulation module entity.

Step S1114: The intent pre-evaluation and simulation module entity receives the operation information response message from the knowledge management module entity.

For example, the operation information response message includes operation impact information or second KPI impact information. The operation impact information indicates mutual exclusion information of the second operation, and the second KPI impact information indicates impact of the second operation on the network KPI. For example, the operation information response message may further include information about effective time of the second operation. The operation impact information, the second KPI impact information, and the information about the effective time of the second operation are the operation impact information, the second KPI impact information, and the information about the effective time of the second operation in the first information in the embodiment in FIG. 8. For details, refer to step S804.

Step S1115: The intent pre-evaluation and simulation module entity sends another intent request message to the intent management module entity.

This step is an optional step.

Step S1116: The intent management module entity receives the another intent request message from the intent pre-evaluation and simulation module entity.

This step is an optional step.

Step S1117: The intent management module entity sends another intent response message to the intent pre-evaluation and simulation module entity.

This step is an optional step.

Step S1118: The intent pre-evaluation and simulation module entity receives the another intent response message from the intent management module entity.

This step is an optional step. For example, the another intent response message includes information about an intent corresponding to another network KPI other than the network KPI. The information about the intent corresponding to the another network KPI other than the network KPI is the information about the intent corresponding to the another network KPI other than the network KPI in the first information in the embodiment in FIG. 8. For details, refer to step S804.

The intent pre-evaluation and simulation module entity sends the another intent request message to the intent management module entity, and correspondingly, the intent management module entity sends the another intent response message to the intent pre-evaluation and simulation module entity based on the another intent request message. This manner can assist an intent system in intent conflict detection, to improve system performance.

Step S1119: The intent pre-evaluation and simulation module entity determines, based on first information, an evaluation value corresponding to the pre-evaluation information.

For example, the first information includes one or more of the following: operation impact information or second KPI impact information. The first information further includes one or more of the following: network performance data information, information about effective time of the second operation, and information about an intent corresponding to another network KPI other than the network KPI. For details, refer to step S805.

Step S1120: The intent pre-evaluation and simulation module sends the evaluation value to the BSS/OSS/APP/User through the intent management module entity.

The evaluation value may be carried in an intent creation complete message.

Step S1121: The BSS/OSS/APP/User receives the evaluation value from the intent pre-evaluation and simulation module entity through the intent management module entity.

Certainly, the intent translation module entity and the intent pre-evaluation module entity shown in FIG. 11A to FIG. 11C may be integrated into one module entity, for example, an intent translation and pre-evaluation module entity. The intent translation and pre-evaluation module entity can implement functions implemented by both the intent translation module entity and the intent pre-evaluation module entity.

The foregoing describes in detail the method in embodiments of this application. The following provides an apparatus in embodiments of this application.

Figure 12:
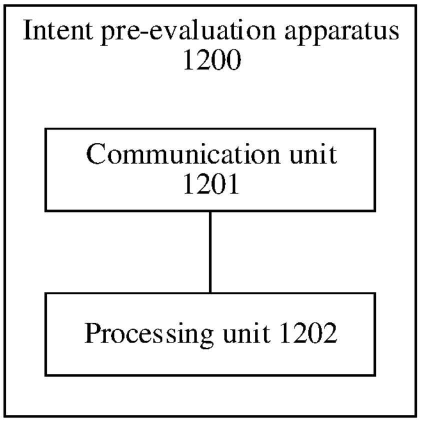
FIG. 12 is a diagram of an example intent pre-evaluation apparatus according to an embodiment of this application.

FIG. 12 is a diagram of a structure of an example intent pre-evaluation apparatus 1200 according to an embodiment of this application. The apparatus 1200 may include a communication unit 1201 and a processing unit 1202. Detailed descriptions of the units are as follows:

The communication unit 1201 is configured to receive an intent target and a pre-evaluation type from a second network element, where the pre-evaluation type includes pre-evaluation information of an intent achievement result or pre-evaluation information of impact on a network key performance indicator (KPI), and the intent target includes a first operation.

The communication unit 1201 is configured to receive first information from a third network element, where the first information includes one or more of the following: operation impact information or first KPI impact information. The operation impact information indicates mutual exclusion information of the first operation, and the first KPI impact information indicates impact of the first operation on a KPI associated with the intent target or impact of the first operation on the network KPI.

The processing unit 1202 is configured to determine, based on the first information, result information corresponding to the pre-evaluation type, where the result information includes pre-evaluation information of an intent achievement result or pre-evaluation information of impact on a KPI.

The communication unit 1201 is configured to send the result information to the second network element.

In a possible implementation, the intent target includes an identifier of the intent target and/or a target value of the intent target.

In another possible implementation, the communication unit 1201 is further configured to receive one or more of the following from the second network element: a pre-evaluation termination condition or a maximum pre-evaluation duration, where the pre-evaluation termination condition is used to determine whether to continue or terminate a process in which the apparatus determines, based on the first information, the result information corresponding to the pre-evaluation type; and the maximum pre-evaluation duration is used to determine whether to continue or terminate a process in which the apparatus determines, based on the first information, the result information corresponding to the pre-evaluation type.

In another possible implementation, if the result information includes the pre-evaluation information of the intent achievement result, the result information further includes one or more of the following: confidence of the result information, a duration required for achieving the intent target, or a reason why the intent target is not achieved.

In another possible implementation, if the result information includes the pre-evaluation information of the impact on the KPI, the result information further includes one or more of the following: the confidence of the result information, a KPI list corresponding to the pre-evaluation information of the impact on the KPI, and confidence of the pre-evaluation information of the impact on the KPI.

In another possible implementation, the first information further includes one or more of the following: network performance data information, information about effective time of the first operation, and information about another intent target other than the intent target.

In another possible implementation, the network KPI includes one or more of the following: a latency, a throughput rate, a rate, physical resource block (PRB) utilization, a jitter, a radio resource control (RRC) setup success rate, a quality of service flow (QoS) flow setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

It should be noted that, for implementation and beneficial effects of the units, refer to the corresponding descriptions of the method embodiments shown in FIG. 7, FIG. 9A to FIG. 9C, and FIG. 10A and FIG. 10B.

FIG. 12 is a diagram of a structure of an example intent pre-evaluation apparatus 1200 according to an embodiment of this application. The apparatus 1200 may include a communication unit 1201 and a processing unit 1202. Detailed descriptions of the units are as follows:

The communication unit 1201 is configured to receive pre-evaluation information of impact on a network key performance indicator (KPI) from a second network element.

The communication unit 1201 is configured to receive first information from a third network element, where the first information includes one or more of the following: operation impact information or second KPI impact information, the operation impact information indicates mutual exclusion information of a second operation, the second KPI impact information indicates impact of the second operation on the network KPI, and the second operation is an operation that affects the network KPI.

The processing unit 1202 is configured to determine, based on the first information, an evaluation value corresponding to the pre-evaluation information.

The communication unit 1201 is configured to send the evaluation value to the second network element.

In a possible implementation, the communication unit 1201 is further configured to receive one or more of the following from the second network element: a pre-evaluation constraint condition, a pre-evaluation termination condition, or a maximum pre-evaluation duration, where the pre-evaluation constraint condition indicates a constraint in performing a process of determining, based on the first information, the evaluation value corresponding to the pre-evaluation information; the pre-evaluation termination condition is used to determine whether to continue or terminate a process of determining, based on the first information, the evaluation value corresponding to the pre-evaluation information; and the maximum pre-evaluation duration is used to determine whether to continue or terminate a process of determining, based on the first information, the evaluation value corresponding to the pre-evaluation information.

In another possible implementation, the communication unit 1201 is configured to determine, based on the first information, the evaluation value corresponding to the pre-evaluation information and confidence of the evaluation value.

In another possible implementation, the first information further includes one or more of the following: network performance data information, effective time of the second operation, and information about an intent corresponding to another network KPI other than the network KPI.

In another possible implementation, the network KPI includes one or more of the following: a latency, a throughput rate, a rate, physical resource block (PRB) utilization, a jitter, a radio resource control (RRC) setup success rate, a quality of service flow (QoS) flow setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

It should be noted that, for implementation and beneficial effects of the units, refer to the corresponding descriptions of the method embodiments shown in FIG. 8 and FIG. 11A to FIG. 11C.

Figure 13:
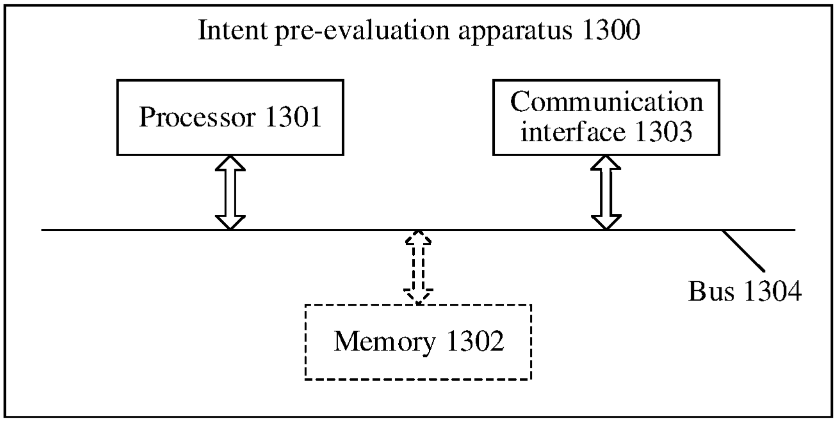
FIG. 13 is a diagram of an example intent pre-evaluation apparatus according to an embodiment of this application.

FIG. 13 shows an example intent pre-evaluation apparatus 1300 according to an embodiment of this application. The apparatus 1300 includes at least one processor 1301 and a communication interface 1303. Optionally, the apparatus 1300 further includes a memory 1302. The processor 1301, the memory 1302, and the communication interface 1303 are connected to each other through a bus 1304.

The memory 1302 includes but is not limited to a random access memory (RAM), a read-only memory (ROM), an erasable programmable read-only memory (EPROM), or a compact disc read-only memory (CD-ROM). The memory 1302 is configured to store related computer programs and data. The communication interface 1303 is configured to receive and send data.

The processor 1301 may be one or more central processing units (CPU). When the processor 1301 is one CPU, the CPU may be a single-core CPU, or may be a multi-core CPU.

The processor 1301 in the apparatus 1300 is configured to read computer program code stored in the memory 1302, to perform the following operations:

receiving an intent target and a pre-evaluation type from a second network element through the communication interface 1303, where the pre-evaluation type includes pre-evaluation information of an intent achievement result or pre-evaluation information of impact on a network key performance indicator (KPI), and the intent target includes a first operation;

receiving first information from a third network element through the communication interface 1303, where the first information includes one or more of the following: operation impact information or first KPI impact information, the operation impact information indicates mutual exclusion information of the first operation, and the first KPI impact information indicates impact of the first operation on a KPI associated with the intent target or impact of the first operation on the network KPI;

determining, based on the first information, result information corresponding to the pre-evaluation type, where the result information includes pre-evaluation information of an intent achievement result or pre-evaluation information of impact on a KPI; and sending the result information to the second network element through the communication interface 1303.

In a possible implementation, the intent target includes an identifier of the intent target and/or a target value of the intent target.

In another possible implementation, the at least one processor 1301 is further configured to receive one or more of the following from the second network element through the communication interface 1303: a pre-evaluation termination condition or a maximum pre-evaluation duration, where the pre-evaluation termination condition is used to determine whether to continue or terminate a process in which the apparatus determines, based on the first information, the result information corresponding to the pre-evaluation type; and the maximum pre-evaluation duration is used to determine whether to continue or terminate a process in which the apparatus determines, based on the first information, the result information corresponding to the pre-evaluation type.

In another possible implementation, if the result information includes the pre-evaluation information of the intent achievement result, the result information further includes one or more of the following: confidence of the result information, a duration required for achieving the intent target, or a reason why the intent target is not achieved.

In another possible implementation, if the result information includes the pre-evaluation information of the impact on the KPI, the result information further includes one or more of the following: the confidence of the result information, a KPI list corresponding to the pre-evaluation information of the impact on the KPI, and confidence of the pre-evaluation information of the impact on the KPI.

In another possible implementation, the first information further includes one or more of the following: network performance data information, information about effective time of the first operation, and information about another intent target other than the intent target.

In another possible implementation, the network KPI includes one or more of the following: a latency, a throughput rate, a rate, physical resource block (PRB) utilization, a jitter, a radio resource control (RRC) setup success rate, a quality of service flow (QoS) flow setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

It should be noted that, for implementation and beneficial effects of the operations, refer to the corresponding descriptions of the method embodiments shown in FIG. 7, FIG. 9A to FIG. 9C, and FIG. 10A and FIG. 10B.

FIG. 13 shows an example intent pre-evaluation apparatus 1300 according to an embodiment of this application. The apparatus 1300 includes at least one processor 1301 and a communication interface 1303. Optionally, the apparatus 1300 further includes a memory 1302. The processor 1301, the memory 1302, and the communication interface 1303 are connected to each other through a bus 1304.

The memory 1302 includes but is not limited to a random access memory (RAM), a read-only memory (ROM), an erasable programmable read-only memory (EPROM), or a compact disc read-only memory (CD-ROM). The memory 1302 is configured to store related computer programs and data. The communication interface 1303 is configured to receive and send data.

The processor 1301 may be one or more central processing units (CPU). When the processor 1301 is one CPU, the CPU may be a single-core CPU, or may be a multi-core CPU.

The processor 1301 in the apparatus 1300 is configured to read computer program code stored in the memory 1302, to perform the following operations:

receiving pre-evaluation information of impact on a network key performance indicator (KPI) from a second network element through the communication interface 1303;

receiving first information from a third network element through the communication interface 1303, where the first information includes one or more of the following: operation impact information or second KPI impact information, the operation impact information indicates mutual exclusion information of a second operation, the second KPI impact information indicates impact of the second operation on the network KPI, and the second operation is an operation that affects the network KPI;

determining, based on the first information, an evaluation value corresponding to the pre-evaluation information; and sending the evaluation value to the second network element through the communication interface 1303.

In a possible implementation, the at least one processor 1301 is further configured to receive one or more of the following from the second network element through the communication interface 1303: a pre-evaluation constraint condition, a pre-evaluation termination condition, or a maximum pre-evaluation duration, where the pre-evaluation constraint condition indicates a constraint in performing a process of determining, based on the first information, the evaluation value corresponding to the pre-evaluation information; the pre-evaluation termination condition is used to determine whether to continue or terminate a process of determining, based on the first information, the evaluation value corresponding to the pre-evaluation information; and the maximum pre-evaluation duration is used to determine whether to continue or terminate a process of determining, based on the first information, the evaluation value corresponding to the pre-evaluation information.

In another possible implementation, the at least one processor 1301 is further configured to determine confidence of the evaluation value based on the first information.

In another possible implementation, the first information further includes one or more of the following: network performance data information, effective time of the second operation, and information about an intent corresponding to another network KPI other than the network KPI.

In another possible implementation, the network KPI includes one or more of the following: a latency, a throughput rate, a rate, physical resource block (PRB) utilization, a jitter, a radio resource control (RRC) setup success rate, a quality of service flow (QoS) flow setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, or a base station energy efficiency level.

In another possible implementation, the mutual exclusion information includes identification information of mutually exclusive operations, or indication information indicating whether there is mutual exclusion.

It should be noted that, for implementation and beneficial effects of the operations, refer to the corresponding descriptions of the method embodiments shown in FIG. 8 and FIG. 11A to FIG. 11C.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. An example storage medium is coupled to a processor, so that the processor can read information from the storage medium and can write information into the storage medium. Certainly, the storage medium may alternatively be a part of the processor. The processor and the storage medium may be located in an ASIC. In addition, the ASIC may be located in a network device or a terminal device. Certainly, the processor and the storage medium may exist in the network device or the terminal device as discrete components.

All or some of the foregoing embodiments may be implemented by software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or the instructions may be stored in a computer-readable storage medium or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device such as a server or a data center integrating one or more usable media. The usable medium may be a magnetic medium, for example, a floppy disk, a hard disk drive, or a magnetic tape; or may be an optical medium, for example, a digital video disc; or may be a semiconductor medium, for example, a solid-state drive.

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

In this application, "at least one" means one or more, and "a plurality of" means two or more. The term "and/or" describes an association relationship of associated objects, and indicates that any one of three relationships may exist. For example, A and/or B may indicate any one of the following three cases: Only A exists, both A and B exist, or only B exists. A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. Sequence numbers of the foregoing processes do not mean a sequence of execution. The sequence of execution of the processes should be determined according to functions and internal logic of the processes.

What is claimed is:

1. An intent pre-evaluation method, comprising:

receiving, by a first network element, an intent target and a pre-evaluation type from a second network element, wherein the pre-evaluation type comprises pre-evaluation information of an intent achievement result or pre-evaluation information of impact on a network key performance indicator (KPI), and the intent target comprises a first operation;

receiving, by the first network element, first information from a third network element, wherein the first information comprises: operation impact information and/or first KPI impact information, the operation impact information indicates mutual exclusion information of the first operation, and the first KPI impact information indicates impact of the first operation on a network KPI associated with the intent target or impact of the first operation on the network KPI;

determining, by the first network element based on the first information, result information corresponding to the pre-evaluation type, wherein the result information comprises the pre-evaluation information of the intent achievement result or pre-evaluation information of impact on a network KPI; and sending, by the first network element, the result information to the second network element, wherein the first network element further receives from the second network element: a pre-evaluation termination condition and/or a maximum pre-evaluation duration, wherein the pre-evaluation termination condition is used to determine whether to continue or terminate a process in which the first network element determines, based on the first information, the result information corresponding to the pre-evaluation type; and the maximum pre-evaluation duration is used to determine whether to continue or terminate a process in which the first network element determines, based on the first information, the result information corresponding to the pre-evaluation type.

2. The method according to claim 1, wherein the intent target comprises an identifier of the intent target and/or a target value of the intent target.

3. The method according to claim 1, wherein, in response to the result information comprising the pre-evaluation information of the intent achievement result, the result information further comprises: confidence of the result information, a duration required for achieving the intent target, and/or a reason why the intent target is not achieved.

4. The method according to claim 1, wherein, in response to the result information comprising the pre-evaluation information of the impact on the network KPI, the result information further comprises: confidence of the result information, a KPI list corresponding to the pre-evaluation information of the impact on the network KPI, and/or confidence of the pre-evaluation information of the impact on the network KPI.

5. The method according to claim 1, wherein the first information further comprises:

network performance data information, information about effective time of the first operation, and/or information about another intent target other than the intent target.

6. The method according to claim 1, wherein the network KPI comprises: a latency, a throughput rate, a rate, physical resource block (PRB) utilization, a jitter, a radio resource control (RRC) setup success rate, a quality of service flow (QoS flow) setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, and/or a base station energy efficiency level.

7. The method according to claim 1, wherein the mutual exclusion information comprises identification information of mutually exclusive operations, or indication information indicating whether there is mutual exclusion.

8. An intent pre-evaluation method, comprising:

receiving, by a first network element, pre-evaluation information of impact on a network key performance indicator (KPI) from a second network element;

receiving, by the first network element, first information from a third network element, wherein the first information comprises: operation impact information or second KPI impact information, the operation impact information indicates mutual exclusion information of a second operation, the second KPI impact information indicates impact of the second operation on the network KPI, and/or the second operation is an operation that affects the network KPI;

determining, by the first network element based on the first information, an evaluation value corresponding to the pre-evaluation information; and sending, by the first network element, the evaluation value to the second network element, wherein the first network element further receives from the second network element: a pre-evaluation constraint condition, a pre-evaluation termination condition, and/or a maximum pre-evaluation duration, wherein the pre-evaluation constraint condition indicates a constraint in performing a process of determining, based on the first information, the evaluation value corresponding to the pre-evaluation information; the pre-evaluation termination condition is used to determine whether to continue or terminate a process of determining, based on the first information, the evaluation value corresponding to the pre-evaluation information, and the maximum pre-evaluation duration is used to determine whether to continue or terminate a process of determining, based of the first information, the evaluation value corresponding to the pre-evaluation information.

9. The method according to claim 8, wherein the determining, by the first network element based on the first information, an evaluation value corresponding to the pre-evaluation information comprises:

determining, by the first network element based on the first information, the evaluation value corresponding to the pre-evaluation information and confidence of the evaluation value.

10. The method according to claim 8, wherein the first information further comprises:

network performance data information, effective time of the second operation, and/or information about an intent corresponding to another network KPI other than the network KPI.

11. The method according to claim 8, wherein the network KPI comprises: a latency, a throughput rate, a rate, physical resource block (PRB) utilization, a jitter, a radio resource control (RRC) setup success rate, a quality of service flow (QoS) flow setup success rate, a call setup success rate, a radio call drop rate, an intra-frequency handover success rate, an inter-frequency handover success rate, central processing unit (CPU) utilization, a cell availability ratio, a radio network availability ratio, uplink traffic of a data service, downlink traffic of a data service, an average quantity of users, a maximum quantity of users, uplink interference noise, a primary secondary cell (PSCell) change success rate, a total quantity of packets of a protocol data unit (PDU), a total data volume of a PDU, a coverage curve, a reference signal received power (RSRP) average value, a signal to interference plus noise ratio (SINR) average value, a base station energy efficiency value, and/or a base station energy efficiency level.

12. The method according to claim 8, wherein the mutual exclusion information comprises identification information of mutually exclusive operations, or indication information indicating whether there is mutual exclusion.

13. An intent pre-evaluation apparatus, comprising at least one processor, a communication interface, and at least one memory storing a computer program including instructions that, when executed by the at least one processor, cause the apparatus to perform operations comprising:

receiving an intent target and a pre-evaluation type from a second network element, wherein the pre-evaluation type comprises pre-evaluation information of an intent achievement result or pre-evaluation information of impact on a network key performance indicator (KPI), and the intent target comprises a first operation;

receiving first information from a third network element, wherein the first information comprises: operation impact information and/or first KPI impact information, the operation impact information indicates mutual exclusion information of the first operation, and the first KPI impact information indicates impact of the first operation on a network KPI associated with the intent target or impact of the first operation on the network KPI;

determining, based on the first information, result information corresponding to the pre-evaluation type, wherein the result information comprises the pre-evaluation information of the intent achievement result or pre-evaluation information of impact on a network KPI; and sending the result information to the second network elements, wherein the operations further comprise receiving, from the second network element, a pre-evaluation termination condition and/or a maximum pre-evaluation duration, wherein the pre-evaluation termination condition is used to determine whether to continue or terminate a process in which the apparatus determines, based on the first information, the result information corresponding to the pre-evaluation type, and the maximum pre-evaluation duration is used to determine whether to continue to terminate a process in which the apparatus determines, based on the first information, the result information corresponding to the pre-evaluation type.

14. The apparatus according to claim 13, wherein the intent target comprises an identifier of the intent target and/or a target value of the intent target.

15. The apparatus according to claim 13, wherein, in response to the result information comprising the pre-evaluation information of the intent achievement result, the result information further comprises: confidence of the result information, a duration required for achieving the intent target, and/or a reason why the intent target is not achieved.

16. The apparatus according to claim 13, wherein, in response to the result information comprising the pre-evaluation information of the impact on the network KPI, the result information further comprises: confidence of the result information, a KPI list corresponding to the pre-evaluation information of the impact on the network KPI, and/or confidence of the pre-evaluation information of the impact on the network KPI.

* * * * *